US006189393B1

(12) United States Patent
Cates

(10) Patent No.: US 6,189,393 B1
(45) Date of Patent: Feb. 20, 2001

(54) METHOD AND APPARATUS FOR DETECTING SUBTERRANEAN TERMITES

(75) Inventor: Jerry Cates, Round Rock, TX (US)

(73) Assignee: EntomoBiotics Inc., Round Rock, TX (US)

( * ) Notice: Under 35 U.S.C. 154(b), the term of this patent shall be extended for 0 days.

(21) Appl. No.: 09/441,618

(22) Filed: Nov. 16, 1999

Related U.S. Application Data

(63) Continuation-in-part of application No. 09/253,493, filed on Feb. 19, 1999.

(51) Int. Cl.[7] ................................................. A01K 71/00

(52) U.S. Cl. ............................................................. 73/865.8

(58) Field of Search ........................ 73/865.8; 340/573.1, 340/573.2; 43/141, 132.1, 107, 104

(56) References Cited

U.S. PATENT DOCUMENTS 5,921,018 * 7/1999 Hirose et al. ........................ 73/132.1

OTHER PUBLICATIONS

Lewis et al., "Evaluation of Dog–Assisted Searches and Electronic Odor Devices for Detecting the Western Subterranean Termite", Solid Wood Products, Forest Products Journal, vol. 47, No. 10, Oct. 1997.*

* cited by examiner

Primary Examiner—Robert Raevis
(74) Attorney, Agent, or Firm—Jackson Walker, LLP

(57) ABSTRACT

A system for subterranean termite detection, concentration and suppression is provided by deploying quasi-subterranean food masses configured in three functional forms tailored to each phase of a comprehensive program to detect, concentrate and suppress subterranean termite colonies. The detectors have subterranean entry/egress ports leading into lateral passageways connected to one or more vertical cavities joined to a signal port in the dorsal surface of the detector. Subterranean termites seal the signal port with soil detritus, producing a distinctive visual change in the dorsal surface of the detector. This alerts a human observer to the presence of the termites. The signal port may have a reflector in a cavity coupled to the signal port for reflecting light directed thereat to determine occlusion of the cavity by termites. The signal port may also have a mesh disposed thereacross to prevent unwanted obstruction thereof, and to encourage occlusion thereof by a termite's fecal material. The body member may also be impregnated with a unique substance detectable in termite fecal material to ascertain which other detectors have been visited by the termites, the substance providing a detector signature.

13 Claims, 6 Drawing Sheets

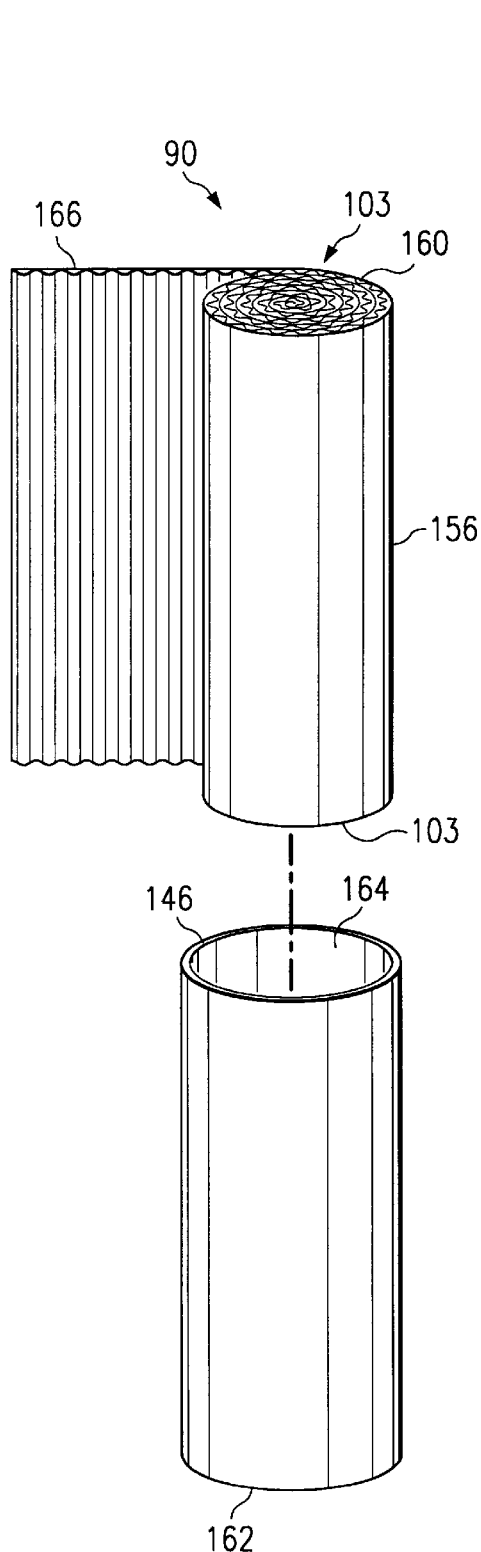
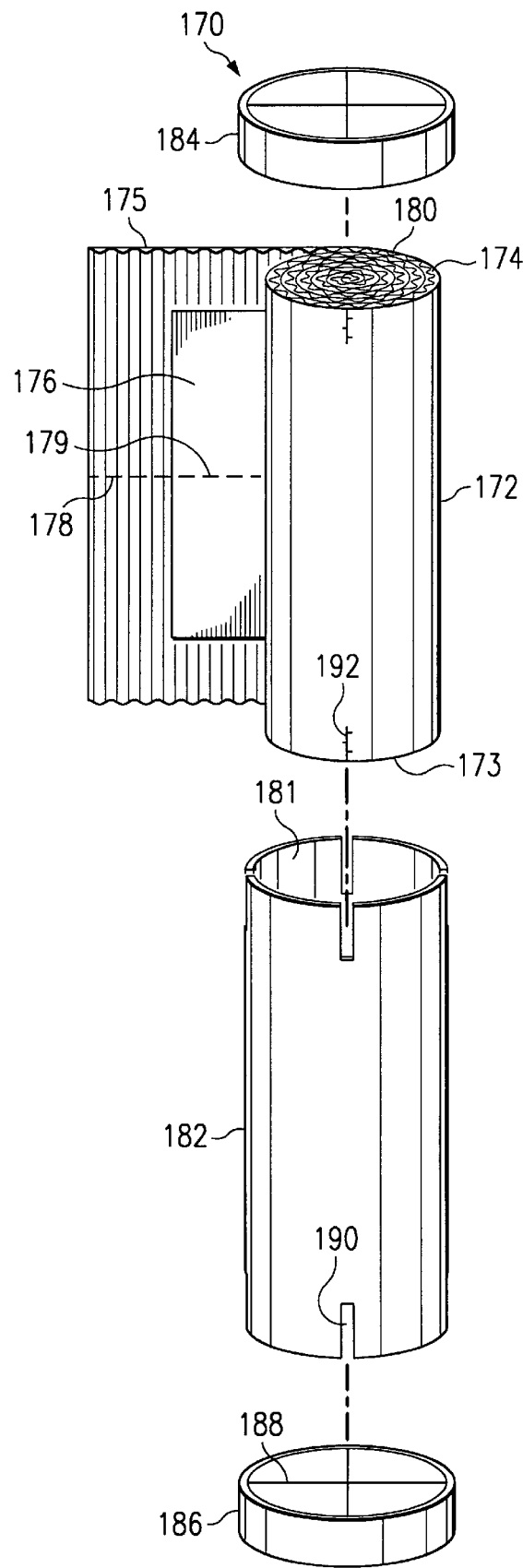
*FIG. 4a*
*FIG. 4b*

METHOD AND APPARATUS FOR DETECTING SUBTERRANEAN TERMITES

CROSS REFERENCE TO RELATED APPLICATIONS

This is a continuation-in-part of copending patent application Ser. No. 09/253,493, entitled System and Method of Detecting, Concentrating and suppressing Subterranean Termites, filed Feb. 19, 1999.

FIELD OF THE INVENTION

This invention relates to termite detectors, concentrators and feeders. It also relates to a method of deploying such devices in concert as a means of detecting, concentrating and suppressing existing termite colonies and protecting a monitored area from future attacks by subterranean termites.

BACKGROUND OF THE INVENTION

The cyclodienes chlordane, first introduced in 1945, and heptachlor were generally regarded as the most effective termiticides in history. They provided 100% control of subterranean termites for 20–30 years or more.

Although chlorinated hydrocarbons had been described since 1873, their insecticidal properties were not discovered until 1939 when Paul Muller, who later received a Nobel prize for doing so, demonstrated the efficacy of DDT. During World War II DDT was credited with saving literally thousands of lives. Later its effectiveness in the field of disease vector control led many to mistakenly believe that it might end the scourge of malaria forever. Not surprisingly, DDT and the related chlorinated hydrocarbons dieldrin, aldrin, chlordane and heptachlor were tested and used extensively as termiticides. For their part, chlordane and heptachlor proved extremely effective against subterranean termites, particularly because, even at low rates of application they remained effective in the soil long after the soil was treated.

The extraordinary persistence of the cyclodienes, which helped make them famous as termiticides and as agricultural pesticides, also led to their downfall. It was shown that they accumulated in the food chain, where processes such as biomagnification increased the risk of injury to non-target organisms, including humans.

After the EPA was established in 1970 data began to surface showing noticeable residues of oxychlordane in human fat tissue. Because of these concerns the use of cyclodienes on food crops in the U.S. was banned. Later, despite intense lobbying by the pest control industry, they were further banned from the field of termite control, effective in the month of April, 1987. Other countries followed suit until, today, neither chlordane nor heptachlor may be legally applied anywhere in the world.

This action, while warranted, left a significant void. No equivalent soil drench termiticides have since been discovered to replace the cyclodienes.

In the early 1980's, as it appeared that the days of the cyclodienes as termiticides were numbered, several alternative chemicals were registered with the EPA. Since that time, the number of such alternative products has risen sharply. Reports surfacing not long after the 1987 ban indicated that many of these not only worked as well, but were even more effective than the cyclodienes. However, the new products only lasted in the soil for a few years. Furthermore, their longevity was affected by type, pH, and organic content of the soil. Even under favorable conditions, a significant depletion of termiticide occurred by the end of the fifth year following application.

Homeowners and businesses in the United States of America annually spend in excess of $1.7 billion to combat termite infestations. Therefore a sizeable market for effective termite extermination products and methods exists in this country. Significant expenditures also occur on the European continent, in Asia, and in Australia. Termite damage to wooden structures is a phenomenon that spans the globe. The need for effective termite control exists throughout much of the populated world.

Recent Termite Control Developments

Approximately 160 patents relating to termite control were issued by the U.S. Patent Office between 1971 and the end of 1998. Some 108 of these, representing 68% of the total, were filed after the cyclodienes were banned in 1987.

Almost 39% of the termite-related patents issued over the past 26 years involved new termite toxicants. Many of these are used in the same manner as the cyclodienes, i.e., as soil drenches, serving as repellents and barriers against termite infestation. Others are intended to suppress a termite colony's population by poisoning or otherwise rendering ineffective a large number of its members. In this latter group are found contact poisons, biological agents, e.g. Metarrhizium anisopliae, gastrointestinal poisons, e.g., Sulfluramid, and insect growth regulators and chitin synthesis inhibitors, e.g., Hexaflumuron.

A number of physical barriers have also been invented during this period. For example, U.S. Pat. No. 5,417,017 discloses a stainless steel mesh that is woven so tightly that termites are unable to pass through it.

Besides new toxicants and physical barriers, new methodologies for creating safer, more effective methods of applying chemically based termite barriers have been invented as well. Some of these seek to reduce the risk of human exposure to chemicals:

U.S. Pat. No. 5,465,525 issued Nov. 14, 1995 teaches utilizing a computer-controlled robot having an array of sensors, video linkages and pesticide dispensers. Human operators are located remotely where, safe from chemical exposure, they are able to identify where and how extensively termiticides should be dispensed by the robot beneath architectural structures.

U.S. Pat. No. 5,346,699 issued Sept. 13, 1994 teaches using a wet foaming agent to allow a relatively small amount of termite toxicant to create a termite barrier in a void. The foam is used to fill voids in walls and under concrete foundations and walkways, wetting all surfaces of the void before collapsing. Consequently, termites passing over any surface of the void will receive a dose of the toxicant.

U.S. Pat. No. 5,317,831 issued Jun. 7, 1994 teaches using a permanently installed system of tubes and nozzles to periodically deliver measured amounts of liquid termite control fluids throughout the hard-to-reach sub-floor region of structures with pier and beam foundations. Similarly, U.S. Pat. No. 5,819,466 issued Oct. 13, 1998 describes a system that performs an analogous service around the perimeters of homes with monolithic concrete foundations.

New approaches have also been developed in the fields of termite detection, monitoring and baiting. When termite colonies are detected early in their development the door is open to suppress them before they can cause any significant damage.

Detection, monitoring and baiting methods focus on pinpointing active termites and feeding them small, measured amounts of termite-specific toxicants. These are contained in tamper resistant bait servers, and act to reduce the population of the termite colony to the point where it cannot infest entities of economic value.

The process of reducing the population of the termite colony to the point where it cannot infest entities of economic value is referred to in the scientific literature as "suppression and/or elimination". However, the cryptic nature of subterranean termites makes it difficult or impossible to be certain that colony elimination has taken place. For this reason this process will be referred to in this document as "suppression".

Once the termites in a specified area have been successfully suppressed, the area is monitored indefinitely for new signs of active termites. If new signs of active termites are found, a new round of toxicant baiting is initiated.

Termite detection and baiting has been investigated and tested to some degree since before the turn of the century. Scientific interest in this method began to increase in the late 1960's, and continued at a low level in the 1970's and early 1980's. However, the skill and experience required to properly implement detection and baiting methodologies discouraged widespread exploration for technically or economically feasible approaches as long as the highly successfull and inexpensive cyclodienes could be used. Following the 1987 ban a number of important advances in each of these fields has occurred in quick succession:

An acoustic emission detector, capable of sensing the vibrations produced by termites when they break the cellulose and lignin fibers of the wood they are consuming, is described in U.S. Pat. No. 4,895,025 issued Jun. 26, 1990. Since that date at least five other acoustic or vibration sensing devices have also been patented.

A system for detecting, monitoring and baiting termites is described in U.S. Pat. Nos. 5,676,960 issued Oct. 14, 1997 and 5,509,879 issued Mar. 11, 1997. These systems use a comprehensive termite detection, trapping, separation and treatment methodology to aggregate large numbers of the members of a termite colony. The termites are then manually coated with a termite toxicant mixed with an adhesive resin and released. Once the coated termites return to the colony the untreated workers instinctively groom them to remove the toxicant coating. In the process, the previously untreated workers contaminate themselves and their nest mates with lethal doses of the toxicant material.

Another termite detection, monitoring and baiting system is described in U.S. Pat. Nos. 5,329,726 issued Sep. 8, 1992. The apparatus described in this patent involves an in-ground termite detector/server combination containing a detector cartridge that is initially non-toxic. When termites begin feeding on the contents of this cartridge they and the physical damage they cause are noticeable to an inspector, but only after the cartridge has been physically withdrawn from the detector/server housing. Once termites are detected, the detector is converted to a pesticide-containing bait server by discarding the non-toxic feeder cartridge and replacing it with one containing a pesticide. Modifications to the in-ground apparatus that provide for aboveground termite detection and control are also described.

A later patent granted to the same inventors, U.S. Pat. No. 5,555,672 issued Sep. 17, 1996, describes the previously disclosed in-ground termite detector/server, a number of alternative embodiments that enable it to be used in aboveground applications, and guides for directing termite travel. These guides do not recruit termites to the detector/server, but make it difficult for them to leave once they arrive. A still later patent granted to the same inventors, U.S. Pat. No. 5,573,760 issued Nov. 12, 1996 again describes the originally disclosed in-ground termite detector/server alone.

Although the detector/server combination disclosed in these patents is not known to be marketed at the present time, all of the in-ground termite detector/servers placed on the market in the United States over the past four years share important elements and characteristics with it. For example, all of these detector/servers are, for practical purposes, multifunctional devices.

Factors Affecting Cost

The new approaches to termite control that have followed the ban on cyclodiene termiticides are significantly more costly to the consumer than the pre-1987 approaches they replace. As a result, homeowners find it increasingly difficult to afford many of the newer treatment methods. Many medical institutions, municipalities and public school systems, whose plant maintenance budgets are already stretched thin, find themselves in the same spot.

The sharp increase in cost for the new termite treatment approaches has a number of causes; some unique to the approach involved. But one major cause common to all of them involves labor. Each requires the services of highly skilled and experienced technicians. Each also requires more of the technician's time than before. This is especially the case for termite detection and baiting methodologies.

Another major cost booster common to all of the termite detection and baiting systems involves the generally cryptic nature of their convertible detector/servers. Of particular interest is the fact that the inspection of these termite detector/servers requires, as a prerequisite, the completion of several non-trivial, time-consuming and physically challenging tasks.

For example, it is necessary to first dig some of these detector/servers out of the ground e.g., U.S. Pat. No. 5,695,776. In other cases a cap must first be removed before extracting an interior bait cartridge e.g., U.S. Pat. No. 5,573,760. In yet another case the interior bait is left undisturbed but a cap must first be removed to expose the interior termite food source e.g., WO9726788A1. All of the caps involved, except that of U.S. Pat. No. 5,573,760, which is not known to be presently on the market, stipulate the use of special keys to prevent unauthorized access to the interior of the detector/server.

Once the interiors of these detector/servers are exposed, the inspector must still visually examine them for evidence of active termites. This process is often complicated by extraneous factors such as the presence of other organisms and debris.

Human Factors

It is generally possible to establish, from an analysis of the various steps involved in a given task, how well the task is likely to be performed once by an average worker. It is more difficult to establish how well such a task is likely to be performed repetitively because, aside from the complexity of the task itself, repetition introduces other variables that must also be accounted for.

It is well known in the field of human factors engineering that the performance of complex, repetitive operations varies based on the nature of their accompanying psychological and physiological rewards and detractors. For example, positive psychological rewards have a motivating influence and consistently lead to improvements in performance. Conversely, negative psychological detractors, or physiological detractors inherent to complex, repetitive task schemata, or those that typically cause the operator to experience pain and discomfort when the operation is performed, have a demotivating influence and consistently lead to performance degradation.

In the case of the inspection of termite detector/servers that are currently on the market, the inspector receives a positive psychological reward when a previously quiescent detector is discovered to contain active termites. The positive reward presumably derives from the fact that the inspection process has successfully revealed important, new information. This reinforces its worth and that of the inspector as well.

On the other hand, inspecting a presently quiescent detector/server that had been quiescent on all previous inspections constitutes an annoying psychological detractor the first time, but develops into an increasingly severe psychological detractor with the number of consecutively quiescent detector/servers inspected. These effects are of little or no consequence for trivial tasks that are performed infrequently, but they increase in significance with the complexity of the task and its frequency of repetition. The inspection of the detector/server may be perceived as a waste of the inspector's time since it only reinforces negative data. This lowers the worth of the inspection process, and by inference, that of the inspector as well.

Numerous studies have been published describing the results of field trials using one or more of the currently marketed detector/servers. Typically, these papers have shown that, even in areas known to harbor active subterranean termite infestations, it is not unusual for only a small fraction of the deployed detector/servers to become infested with active termites. Obviously, for areas devoid of active termites, where the detector/servers serve as early warning devices, none of the detector/servers will become infested until termite foragers encroach on the area, a process that may not develop for years. Despite this, it is critically important that each detector/server be inspected carefully and completely on the chance that active termites will be found. The risk of performance degradation, under such conditions, is very great.

In addition to the psychological detractors common to the currently marketed termite detector/servers, they are also plagued with a number of physiological detractors. The inspection of each termite detector requires the articulation of all the major joints in the upper and lower extremities as well as flexion of the cervical, thoracic and lumbar spine. These articulations are, for example, a necessary part of wielding a shovel to dig up a detector/server and of bending over or squatting down to pick it up for inspection. For capped detector/servers, the inspector either bends over, squats down or kneels, removes the cap, and either withdraws the contents or crouches closer to the detector/server before conducting a visual examination.

These physically challenging articulations suggest that an individual with a perfectly healthy musculature and spine, and with no diseases of the joints, may naturally experience some degree of pain and discomfort during the inspection of a single detector/server. Individuals with orthopedic dysfunctions will experience even greater degrees of pain and discomfort, depending on the location and severity of their disease. Such persons will have considerable difficulty performing these steps consistently well, if they can perform them at all.

According to the Arthritis Foundation, nearly 1 in 7 Americans is afflicted with arthritis, making this disease one of the most prevalent chronic health problems and the number one cause of limitation in movement in the United States. Furthermore, anyone can get arthritis. It affects people in all age groups. A recent study indicates that the prevalence of arthritis or other rheumatic condition within the U.S. is expected to climb to 59.4 million, or 18.2% of the population by the year 2020. It should be clear, therefore, that complex tasks, especially those involving repetition, should be designed to minimize the incidence of pain and discomfort for those operators who may be afflicted with arthritis or related disorders.

Mild arthritis will not prevent an inspector from performing infrequent inspections of one or two of any of the detector/servers now on the market. Unfortunately, they are not designed to be inspected infrequently, nor one or two at a time. A successful termite technician can be expected to spend several hours a day inspecting for termite activity at various client locations. Under such conditions, with the orthopedic manipulations required to inspect these devices, even the mildest form of arthritis might become a debilitating handicap within a short period.

These orthopedic manipulations also occur prior to the most critical part of the inspection process, namely the visual examination of the bait material for evidence of active termites. With the detector/servers currently on the market, the inspector is required to assume the role of a skilled field entomologist, marshalling a depth of knowledge, experience and an educated eye to visually scan for evidence of termite activity.

Inspecting the interior of an open, subterranean but non-removable bait station for the presence of termites from a crouching position, as required by one style of detector/server, or a removable detection stake or cartridge from other styles of detector/servers, requires excellent lighting and good visual acuity. If the inspector is visually impaired, or if light conditions are unfavorable, a satisfactory inspection is impossible without supplementary lighting, corrective eyewear and/or the use of magnification aids. During periods of high exterior temperatures and/or humidity, the use of corrective eyewear or magnification aids becomes more problematic, increasing the risk of poor performance on the part of the inspector.

The net of these considerations is that, owing to certain common design features, these termite detector/servers present a number of unacceptable negative physiological detractors that will be felt by all persons. For those with even minor disabilities, i.e., for a sizeable fraction of the available work force, the user-unfriendly character of these devices will likely be so serious that quality of service must be sacrificed at once in order to avoid an unbearable level of discomfort and pain.

As in the case of the psychological detractors previously discussed, these negatives should be expected to result in serious performance degradations. Degradations in performance normally expected from both sets of causes would, for example, include reporting skipped stations as inspected and reporting incomplete inspections as though a thorough inspection had been done.

Strong circumstantial evidence exists that the manufacturers of these devices are aware that inspections of their detector/servers may be prone to performance degradation. This evidence rests chiefly on the steps these manufacturers have been observed to take to limit the difficulties associated with the inspection process and mitigate the risks of skipped or incomplete inspections.

For example, hand-held computers equipped with scanning devices are often promoted as labor saving aids to the manual inspection process. However, in some cases they are actually little more than compliance enforcement tools that effectively prevent the false reporting of skipped stations and their use imposes an additional workload on the inspector, rather than the expected reduction, fronically, far from mitigating over all risk, reliance on these accessories ignores the issues of task rewards and detractors and increases the labor and tedium of the inspection process. Furthermore, even the most ingenious compliance enforcement programs are subject to manipulation and circumvention in the hands of clever and disenchanted operators. Finally, they fail to guarantee that the inspector will perform the remaining steps of inspection in a competent and thorough fashion.

In another approach taken to limit the difficulties associated with inspecting existing in-ground termite detector/servers, the recommended interval between each termite detection unit is lengthened, so that fewer detector/servers are prescribed for a given site. Applicant's field testing has consistently shown that the maximum interval between detectors should not exceed 1.5 meters. The termite detector/servers on the market today, however, generally recommend an interval on the order of from 3 to 10 meters.

Although ignoring the difficulties involved in inspecting each detector/server, lengthening the recommended interval between each detector/server does reduce the total of such difficulties that will be encountered at a given site. Unfortunately, the sensitivity of the detector/server installation suffers greatly in the process. It is important to include the perimeters of privacy fences, detached sheds, and such things as woodpiles in the detection zone, since many termite infestations begin at these locations. The emphasis on placing as few detector/servers as possible, however, generally rules these areas out in favor of a zone around the most important structure at the site.

Another approach has been to de-emphasize the use of in-ground detectors in favor of above-ground devices such as that disclosed in U.S. Pat. No. 5,832,658 issued Nov. 10, 1998. Above-ground termite monitors are also discussed in a number of recent scientific studies. However, the use of above-ground termite monitors and bait servers as detectors is of questionable utility, since their success means that termites are already infesting the entity being monitored, and the important early warning potential of an extensive in-ground termite detection system is sacrificed.

U.S. Pat. No. 5,815,090 issued Sep. 29, 1998 proposes yet another approach to resolving the difficulties involved in manually inspecting the currently marketed inground termite detector/servers. The system disclosed in that patent takes the human inspector out of the picture altogether, in favor of a fully computerized termite sensing and reporting system. Computer-inspected termite sensors, comprised of termite edible material and an electrical conductor, are inserted into the soil to form a termite detection zone much the way the manually inspected detector/servers are.

The electrical conductor of the computer-inspected termite sensor is arranged in the form of a bridging circuit that is disrupted when termites feed on it. The sensor is attached to a computer whose software is capable of interpreting the electrical signals from the sensor and registering the presence of termites. Once such a system is installed at a site, its computer could be programmed to automatically dial a remote office to report the presence of termites, including their precise location within the site.

With this system the high costs associated with manual inspections of in-ground detector/servers are exchanged for the high costs of sophisticated computer-inspected termite sensors and their associated electronic accessories. Considering the severity of the difficulties associated with the inspection of the in-ground detector/servers now on the market, and assuming that these difficulties cannot be remedied within the framework of a manual inspection program, this invention would appear to offer a viable and reasonable alternative. At least it addresses the rewards/detractors issue, and conceivably improves the accuracy of the inspection process.

Rather than improving on existing manual inspection approaches, the inventor of U.S. Pat. No. 5,815,090 concluded that a computerized system, without human inspectors, stands a greater chance of success. In the summary provided with that patent the inventor noted that the reduced or eliminated need for manual inspections may allow for more comprehensive monitoring.

In other words, more computer-inspected sensors may be installed at a given site than would be practical for an installation of manually inspected detector/servers. This is a reasonable expectation if manually inspected termite detectors are inherently inefficient and this inefficiency is fundamentally linked to the need for human inspectors. In such a case, the inefficiency of manually inspected termite detector/servers is not susceptible to remediation.

A review of the relevant scientific literature published over the past 20 years has failed to find even one paper that addresses the physiological detractors of the human inspector/termite detector interface. Similarly, none of the termite-related patents issued by the U.S. Patent Office since 1971 appears to make that interface more efficient. Instead, these studies and inventions either ignore the problem, make it worse by adding to the human inspector's workload, or propose new interfaces that eliminate human inspectors.

It is not obvious that remedial measures to date, capable of eliminating most or all of these physiological detractors, are available. Otherwise, these scientists and inventors would have discovered such measures, reported on them, and exploited their potential.

It is desired to provide an improved termite monitoring and detection apparatus that takes into account physiological detractors, provides an early indication of the presence of termites, and provides an effective suppression of termites.

SUMMARY OF THE INVENTION

The present invention achieves technical advantages as an improvement over the prior art in the field of detecting, concentrating, and suppressing subterranean termites. Specifically, the invention takes advantage of certain instinctive behaviors of subterranean termites, and of certain innate visual faculties of human observers directly applicable to the field of termite control. The present invention uses these to make the process of subterranean termite detection easier and more accurate, and to facilitate the concentration of termites, and the delivery of toxicants to them, for the purposes of suppressing the termite colony.

Subterranean termites nest and forage within an extensive, closed, social cuticle. When a given subterranean termite colony locates a fresh source of food it incorporates that source into its social cuticle by extending the latter's boundaries to include the boundaries of the new source of food. In the process, the termites seal any openings in the food source that would otherwise expose the colony to the threat of predation or dehydration.

The present invention orchestrates the use of three distinct devices to detect, concentrate and treat subterranean termites. Those experienced in the field of social insect behavior will note that the present invention could be applied to other wood destroying insects as well.

BRIEF DESCRIPTION OF THE DRAWINGS

FIG. 4a illustrates an exploded perspective view of one embodiment of a feeder assembly having a bait mass enclosed laterally in a durable casing with its dorsal and ventral surfaces open;

FIG. 4b illustrates an exploded perspective view of a further embodiment of a feeder assembly featuring two separate bait masses and dorsal and ventral end caps to provide for tamper resistance;

DETAILED DESCRIPTION OF THE PREFERRED EMBODIMENTS

Overview of the Present Invention

Figure 1A:
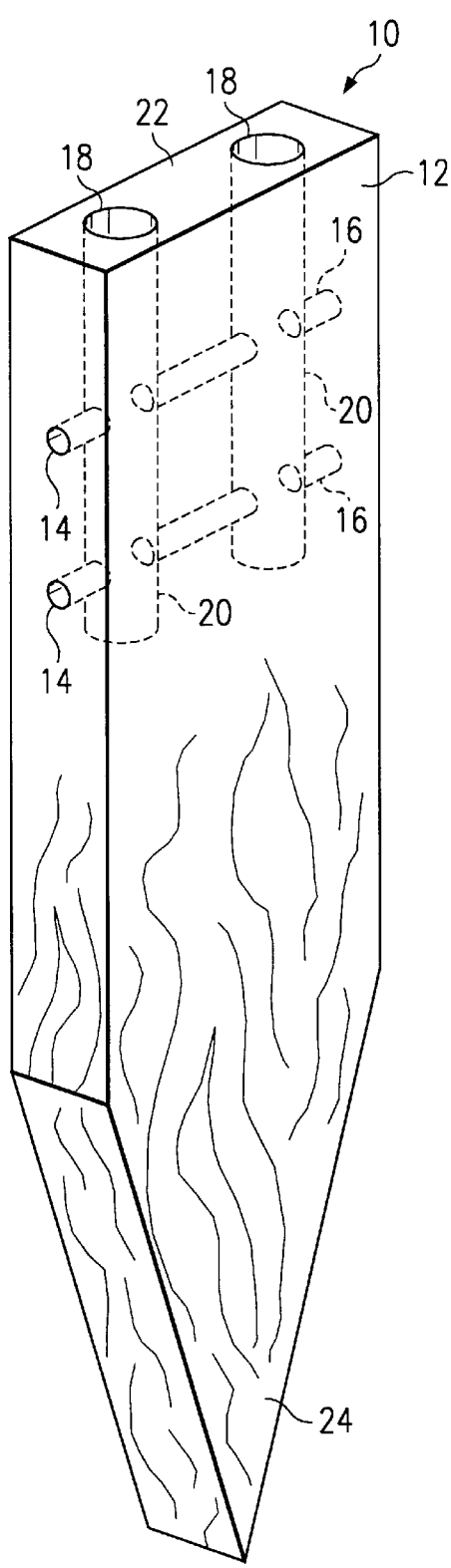
FIG. 1a illustrates a perspective view of one embodiment of a subterranean termite detector with two upper signal ports and a plurality of lateral ingress/egress ports in communication with the signal ports.

The invention disclosed herein recognizes the significance of both the hysiological and psychological detractors. The invention is conceived in the belief that he manual inspection of termite detectors is not inherently inefficient. On the contrary, humans have the potential to provide the most effective and least costly means of inspecting for termite activity, given the right tools. The fundamental problem, therefore, is not with the human inspectors but with the design of prior art detector/servers themselves.

The multifunctional termite detector/servers currently on the market are intended to perform as non-toxic detectors until active termites are found within them, but at that point they are immediately converted to toxic bait servers. This duality of function imposes design constraints that result in a much more complicated device than might be the case for a single-function detector alone. For example, the security features necessary for a toxic bait server are totally unneeded in a standalone non-toxic detector, yet these features significantly and unnecessarily encumber the inspection process.

The termite detector of the present invention accomplishes two primary objectives: (1) efficiently attracts termites, and (2) effectively annunciates their presence. Efficient attraction of termites provides that when a detector is placed within the foraging area of an active termite colony, the termites will not fail to be attracted to it within a reasonable time. The detector provides an effective annunciation signal that is clear, unambiguous, and discernible from a distance.

Existing termite detector/servers fail the test of efficient attraction simply because their per-unit expense, expressed primarily in terms of inspection complexity, prevents them from being deployed in the densities needed to meet the reasonable time test. Termites forage in a quasi-random fashion until they find a food source, and then they feed on that food source tenaciously. This may reasonably be interpreted to mean that deploying detectors in as dense a pattern as practical will decrease the time between deployment and termite activity in one or more of the detectors.

These same prior art detector/servers fail as efficient annunciators because the signals they produce are not clear or unambiguous, and are not discernible from a distance. By way of example, a common traffic light meets these criteria well: its illuminated element, discernible from a distance, annunciates via a clear and unambiguous color-coded signal that a driver may proceed, must come to a stop, or must prepare for a forthcoming stop command. The driver does not have to interpret this annunciation beyond associating the color of the illuminated element with one of three possible commands. Existing detector/servers, on the other hand, tell the inspector nothing until they are opened up. Then, in the role of a field entomologist, the inspector must carefully interpret the visual cues provided by the detector/server's contents before rendering a judgement.

The present invention recognizes and utilizes the specific habits and behaviors demonstrated by subterranean termites in response to the threats of predation and dehydration in a simple way to detect the presence of termite infestations. The characteristics of termite foraging behavior is utilized in the termite monitoring device, as well as to how many and where termite monitoring devices of various designs should be placed.

Subterranean termites share their native habitat, namely the soil, with various species of ants. Some of these ants are the subterranean termite's most feared enemies, and the antagonistic relationship between them has apparently existed for nearly as long as both have had to share a common habitat, i.e., for perhaps millions of years. Ants appear to play an important role in limiting termite distribution through predation, competition for nesting sites, and disruption of foraging activities.

However, subterranean termites are known to be able to mount an effective defense against ant predation by constructing physical barriers of soil, masticated wood, and salivary secretions. In the absence of raw materials with which to build physical barriers for defense, the Formosan Subterranean Termite *Coptotermes formosanus* Shiraki experienced 100% mortality within only one week when exposed to two ant species, *Pheidole megacephala* F., and *Ochetellus glaber* Mayr. However, when the *C. fornosanus* workers were provided with sand, they were able to avoid annihilation by (1) constructing galleries in the sand that acted as physical barriers, and (2) maintaining a refuge in the galleries that they had managed to completely seal off from the invading ants.

Similar results were reported in a study of the neotropical termite *Nasutitermes corniger* Motschulsky and its interactions with the ant *Camponotus abdominalis* F., a notorious predator. It was discovered in this study that *C. abdominalis* was unable to penetrate a defended termite nest area, i.e., where galleries that were easily sealed and guarded by soldiers gave the termites a decided advantage.

Experiments conducted in association with testing of the instant invention have shown that the Eastern Subterranean Termite *Reticulitermes flavipes* Kollar can successfully defend against the Red Imported Fire Ant *Solenopsis invicta* Buren when provided with native soil with which to construct, seal and defend galleries used for foraging activities.

The present invention recognizes that termites are able to defend against many of their natural predators principally because they have adopted a process of gallery construction and maintenance to which they instinctively attach a high priority. This instinctive behavior requires them to construct, seal and guard a system of galleries within the exclusive confines of which they forage for food and conduct most of their life processes. It has been demonstrated that when termites are able to construct and seal their galleries quickly and efficiently, they are often able to survive and even thrive in the immediate vicinity of some of their most aggressive enemies. Consequently, the construction, sealing and maintenance of galleries may be regarded as an enduring phenotypical expression of an established genetic trait within the superorganism of the termite colony as a whole.

Organisms like termites that base their diet on cellulose do not have an efficient means of obtaining nitrogen. To secure sufficient nitrogen termites have developed a number of strategies or adaptations that significantly affect their behavior. For example, it is common for termites to practice a form of cannibalism. Another strategy is to prefer wood that has been decayed by fungi, thus facilitating the extraction of nitrogen from the wood by the termites.

A further adaptation has been a reduction in the demand for nitrogen by, for example, reducing the mass of the termite's sclerotized proteinaceous cuticle, or outer covering. Thus, while most other insects have a well-developed outer covering, the cuticle in termite workers and soldiers is thin and relatively permeable. This adaptation imposes on the termite the need to provide what one researcher has termed a social cuticle. The social cuticle of the termite is, in fact, its extensive closed gallery system that provides the termite occupants with a relatively humid environment and protects their soft bodies from light, dryness, pathogens, parasites, and predators.

Thus, certain features of termite physiology dramatically reinforce the imperative that termites construct extensive, well-sealed and guarded galleries. When a food source is detected nearby, subterranean termites almost never access that food source before constructing extensive galleries to connect to it. Whenever subterranean termites enter a source of cellulose that already has cavities, whether man-made or made by other organisms, such as carpenter ants, the foraging termites carefully seal all unnecessary external apertures in the food source. These behavioral characteristics, developed partly in response to specific physiological and social needs, and partly in response to the need to provide effective defense against predators, were taken into account in the design of the system for termite detection and monitoring according to the present invention.

In summary, termites live and feed within the confines of a closed nest, yet simultaneously achieve a high degree of mobility. This would be paradoxical except for their ability to transform and expand the boundaries of their nest at will. In other words, they achieve mobility in their environment by constructing gallery extensions that effectively incorporate new foraging or feeding areas into their nest area. The extended boundaries of their nest are thereafter constantly examined to insure that they are sealed and remain so. Subterranean termites in general abhor an open gallery system.

Drywood and dampwood termites differ from subterranean termites in their relative need for contact with the soil. However, all of these species require a closed gallery system to operate within, and the statements made below concerning subterranean termites are generally analogous to some degree to drywood and dampwood termites as well.

Foraging subterranean termites readily infest cellulose food sources in direct contact with the soil, simply because soil is the natural medium in which they build their foraging galleries. Furthermore, most termites, whether classified as subterranean, damp wood, or dry wood species, tend to exhaust local cellulose sources before mounting infestations of those situated more remotely. They appear to choose quasi-randomly among available food items. But once they discover a favorable food site, they tend to forage there tenaciously until the food source has been depleted.

To avoid subterranean termite infestations, residential structures are often constructed so that the wooden members of the structure are, for the most part, separated from the soil by several inches of non-cellulose foundation. This construction practice prevents covert subterranean termite infestations except in areas where the connection between the soil and the cellulose members of the structure is visually obstructed.

Subterranean termites inadvertently signal their presence by the extensive, visible alleries they construct. Similar galleries are often found inside structures that are infested with subterranean termites.

The instant invention provides a termite monitoring and detection apparatus that takes account of these facts and thereby provides an early indication of the presence of termites. By placing in direct contact with the soil termite detector devices of the present invention containing highly palatable cellulose materials, termites will enter and begin consuming. It is concluded, based on the results of laboratory experiments with prototypes of the instant invention, that active infestation of the termite detector devices is hastened if the monitoring devices contain ready-made galleries that the termites can easily seal and defend.

It is further concluded, based on the results of laboratory and field experiments with prototypes of the instant invention, that it is possible to provide a means whereby the monitoring device clearly, unambiguously, and from a distance annunciates the presence of an active subterranean termite infestation. One means of doing this involves constructing a subterranean termite detector of termite attracting material containing a ready-made open gallery system which the termites will instinctively close before they commence to feed within it. An external observer can then merely visually check the detector from above periodically to determine if it has been transformed from an open gallery system to a closed gallery system.

Visually checking the detector from above to determine whether its gallery system is open or closed may be enhanced by the addition of certain visual aids. For example, field and laboratory tests have shown that the addition of a reflective disk placed at the distal end of the vertical passageway of the detector provides a means by which to affirm, immediately, that no obstructions have been introduced into the visible portion of the detector's gallery system. Such a means has the potential to significantly speed up the inspection process by way of rapidly eliminating undisturbed, i.e., null, detectors from further consideration.

Furthermore, field and laboratory testing have also shown that the addition of an external appliance to the body of the detector, in the form of a protective collar, offers several important advantages. Such a collar serves to prevent vegetation from obscuring the detector between inspections and, by increasing the detector's dorsal surface area, makes the detector more visible to an inspector. By constructing said collar so that its position along the length of the detector's shaft is adjustable, the collar also provides vertical stability to detectors inserted into soil of varying depths with only a minimum of soil supplementation. This allows the detector to perform even when inserted into soil as shallow as 25 mm (1 inch) deep. By further constructing said collar of a thick material known to impede the transfer of heat, the collar also serves to insulate the soil immediately adjacent to the deployed detector. This insulating effect is of great value in the case of shallow soils otherwise subject to wide diurnal temperature swings, but is also valuable in deeper soil whose surfaces are subject to wide diurnal and seasonal temperature swings. By moderating such temperature variations, said insulating collar makes the soil immediately adjacent to the deployed detector more hospitable to foraging termites, thus facilitating their foraging activity in the immediate vicinity of the detector and speeding up the termite detection process.

During field tests with the detector configured as described above, it was noted that the unprotected signal port was subject to obstruction by wind-blown debris, and that other organisms such as certain species of spiders would sometimes enter the detector via the signal port and take up residence in the large central vertical cavity. Although these occurrences were relatively infrequent, they were annoying in that they sometimes temporarily reduced the effectiveness of the detector by obstructing the reflective disk. To return a detector so affected to full service it was sometimes necessary to extract it from the soil and physically remove the obstruction.

In an effort to address these concerns various means were tested to provide protection from the two risks of (1) randomly introduced debris, and (2) occlusion of the central vertical cavity by undesirable organisms. In particular, screens of various mesh dimensions and designs were placed over the signal port and glued to the dorsal surface of the detector. In the process it was discovered that a commonly available mosquito netting, constructed of woven synthetic material, provides excellent protection from the two risks listed above. It should be noted, however, that many other netting materials, as well as other means of providing protection of the signal port from the noted risks exist, and it is possible to substitute a wide number of these alternate materials with excellent results while remaining faithful to the essential design of the device, provided that the protective material be of sufficient porosity to allow for a conspicuous exchange of moisture and gases between the interior and exterior of the detector through the signal port in the dorsal surface of the detector. For example, mosquito netting of the form described herein, and most other netting materials tested were found to be acceptable in this respect. On the other hand, plastic sheeting, whether rigid or flexible, and even when perforated by numerous apertures, was not found to be acceptable.

One form of the mosquito netting tested has an asymmetrical mesh, with a long axis of approximately 1 mm. and a maximum short axis of 0.2 mm. Such a mesh effectively excludes all of the organisms that have been shown to produce obstructions in detectors of the instant invention during testing in the field. The individual strands making up this mosquito netting are available in several colors, ranging from white to black. Three separate colors of these strands were tested, namely white, gray, and black, to determine which of these tended to least obstruct the visibility of the reflective disk under a wide variety of external conditions. It was found, by this process, that netting made from black strands did not appear to appreciably obstruct visibility of the reflective disk, even in bright sunlight.

Further it has been found that the subterranean termites are inclined to seal the mesh with purely fecal material, as opposed to an aggregate of soil and fecal material. Application of a substance i.e. chemical that reacts with the fecal material is advantageously used to confirm that the fecal material is in fact that of subterranean termites and thus the presence thereof Testing of the above netting material, glued over the signal port of the detector, continues. In addition to providing protection from the two risks noted above, it is also anticipated that this mesh will provide a matrix that foraging termites will find useful to assist them in preparing a more competent seal of the signal port than would otherwise be possible. One important consequence of this would be that termites will be more likely to consistently place a seal of the signal port directly on the mesh itself, rather than placing the seal more deeply into the vertical cavity, thus making the seal more obvious to an inspector and, consequently, simplifying the inspection process. Testing in the laboratory, using cultured subterranean termite colonies, has clearly demonstrated this to occur.

Prototypes of the instant invention have been fitted with a decal, affixed to their dorsal surfaces, which decal is imprinted with identifiers such as a trademark and a unique serial number. This decal has a centrally located aperture consistent with the size and shape of the signal port in the dorsal surface of the detector. That is, when the decal is affixed to the detector, the edges of its aperture and those of the signal port mate exactly. The netting material described above is affixed to the underside of the aperture of the decal prior to its being affixed to the dorsal surface of the detector, so that the decal serves the additional purpose of effecting an interface between the netting material and the dorsal surface of the detector. There are, of course, numerous other means by which said netting material might be attached to the dorsal surface of the detector.

Description of the Figures

FIG. 1a illustrates one embodiment of a subterranean termite detector 10 comprised of a rigid termite bait material 12 such as wood, having four lateral ingress/egress ports 14 interconnected by lateral passageways 16. 10 has two upper signal ports 18 interconnected to ingress/egress ports 14 by respective interconnecting vertical passageways 20 and passageways 16.

The detector 10 has a tapered lower tip 24 adapted to be inserted into the soil of an area that is thought to be subject to subterranean termite activity. After insertion, most or all of the lateral ingress/egress ports 14 are submerged beneath the surface of the soil. Furthermore, the dorsal surface 22 of the detector containing the signal ports 18 is positioned slightly above the surface of the soil such that the signal ports 18 are visible to a human observer passing in the vicinity of the detector.

Under typical light conditions a significant contrast exists between the light color of the dorsal surface 22 of the detector and the shadow cast internally by an open signal port 18. This contrast permits a human observer with average visual acuity and no special skills of observation to ascertain whether a signal ports 18 are open or closed.

The diameter of the signal ports 18 allow the visual inspection of the detector 10 to be done from a distance. For example, an accurate determination of the status of the signal ports 18 is possible from an erect standing position. Furthermore, an observer with average visual acuity and no special skills can perform a satisfactory examination of a series of detectors 10, placed at predetermined short intervals along the perimeter of a building, in the process of a brisk walk around the building perimeter.

When the detector 10 is inserted into the soil where subterranean termites are foraging for food, one or more foraging termites will eventually come into contact with it. Because the detector 10 is composed of a material attractive to termites for food, the termite begins consuming its bait material 12, and then communicates the location of the bait to other members of the termite colony. This shortly results in a larger number of termites arriving at the detector 10.

When one of the foraging termites encounters an ingress/egress port 14 the termite will instinctively enter it because its architecture and dimensions including ingress/egress ports 14, horizontal passageways 16 and vertical passageways 20 are similar in architecture to the ports termites naturally construct in the wooden objects they typically feed upon.

Upon entering the ingress/egress port 14 the termite instinctively explores the associated horizontal passageway 16 leading from the port 14 to the nearest interconnecting vertical passageway 20 extending down from the respective signal port 18. This vertical passageway 20 is more spacious and has a greater diameter than the narrow horizontal passageway 16 leading from the ingress/egress port, and the termite instinctively explores the vertical passageway 12 to determine if it leads to any opening that allows predators to enter or permits moisture to escape. Subsequently, the termite discovers the plurality of other horizontal passageways 16, and the exposed signal port 18 in the dorsal surface 22 of the detector 10. The plurality of horizontal passageways 16, leading to the vertical passageways 20 leading from the exposed signal port 18, provide the termite with immediate access to the food material in the detector, and the termite instinctively takes steps to include these in the colony's foraging zone. However, the exposed signal port 18 represents a threat, exposing the termite colony to predation and moisture loss, and the termite is instinctively led to seal the signal port 18 prior to commencing feeding on the food material in the detector 10.

Upon discovering the signal port 18 the termite begins to seal the aperture of the signal port 18 and communicates to other members of the termite colony that a breach in the colony's social cuticle has been located. This results in a number of other termites assisting in the process of sealing the aperture of the signal port 18. The termites collect soil detritus from outside the detector 10 and carry it in their mandibles to the site of the open signal port 18. Here, they prepare a glue composed of body secretions and excretia, which is used to attach the soil detritus to the surface of the detector at the site of the aperture of the signal port 18. This process continues until the aperture is completely sealed at or near surface 22.

The sealed, or closed, signal port 18 conveys a markedly different visual impression than an open signal port 18 to a human observer passing near the detector 10. When the observer recognizes that one or several signal ports 18 in a detector 10 under examination has been sealed, the observer makes a note of the location of the detector and continues on the inspection circuit. The surface 22 allows the observer to place a unique identifying symbol, such as a serial number, on the dorsal surface 22 of each detector 10 so that the human observer need only make note of this symbol when discovering a seal in the detector's signal port 18.

Figure 1B:
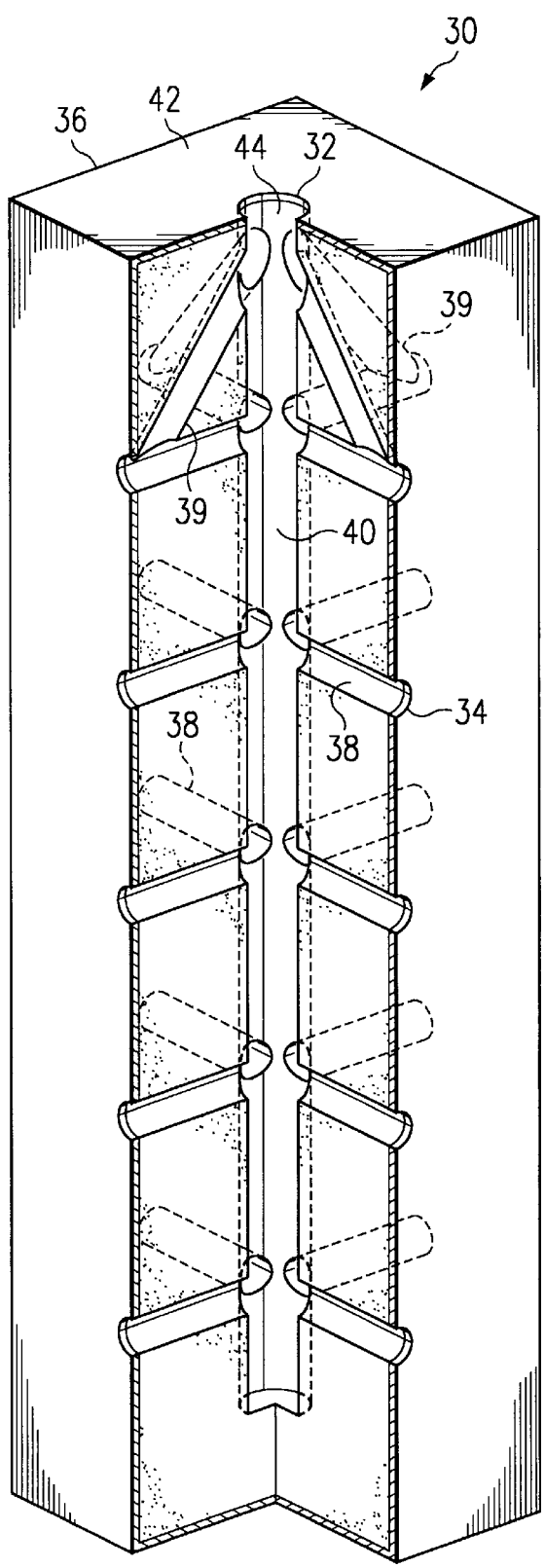
FIG. 1b illustrates a perspective view of a further embodiment of a subterranean termite detector with one upper signal port, a plurality of lateral ingress/egress ports in communication with the signal ports, and having an external coating of corrosion-resistant termite impregnable material.

FIG. 1b illustrates another embodiment of a subterranean termite detector shown at 30. This embodiment differs from detector 10 of FIG. 1a in that it has one signal port 32, has a total of 20 lateral ingress/egress ports 34, comprises of bait material such as wood having a square cross section and is potentially of greater mass, and is coated with a hard corrosion resistant termite impregnable coating 36. Ingress/egress ports 34 are interconnected via laterally extending passageways 38 and an interconnected vertically extending passageway 40 communicating with signal port 32. Passageways 38 have a smaller diameter than passageway 40.

The single signal port 32 may simplify the inspection protocol for a given detector, in that only one signal port 32 needs to be visually examined at each detector insertion site. The greater number of ingress/egress ports 34 potentially reduces the time required for foraging termites, exploring the detector's exterior surfaces, to find and enter an ingress/egress port 34. Other embodiments that follow the general forms shown in FIG. 1a and FIG. 1b are contemplated by the present invention. For example, one may easily vary the number of signal ports and/or ingress/egress ports, as well as the geometry and architecture of the detector's exterior and interior and the arrangements of the ingress/egress passageways and the signal port cavities, while remaining faithful to the essential character of the design.

The hard corrosion resistant coating 36 is light in color, or dark in color, as appropriate to insure a contrast with its normally lighter or darker surroundings, and further simplifying the observation protocol. The signal port 32, typically but not necessarily placed in the middle of the dorsal surface 42 of the detector, contrasts sharply with the color of the coated surface 36, facilitating determination of the status of the signal port 32.

This coating 36 covers all external surfaces of the detector 30, preventing foraging termites from feeding on those surfaces. Consequently, the termites must enter the detector 30 via one of the ingress/egress ports 34 in order to feed on the bait material 44 inside the detector. This coating 36 speeds up the detection process, i.e., as soon as termites find the detector 30 they instinctively are led to seal the signal port 32 without delay.

The hard corrosion resistant coating 36 also acts to extend the life of the detector 30 in the field, because it prevents fungi and mildew from attacking the bait material 44 at its external surfaces where it is most vulnerable.

Figure 6:
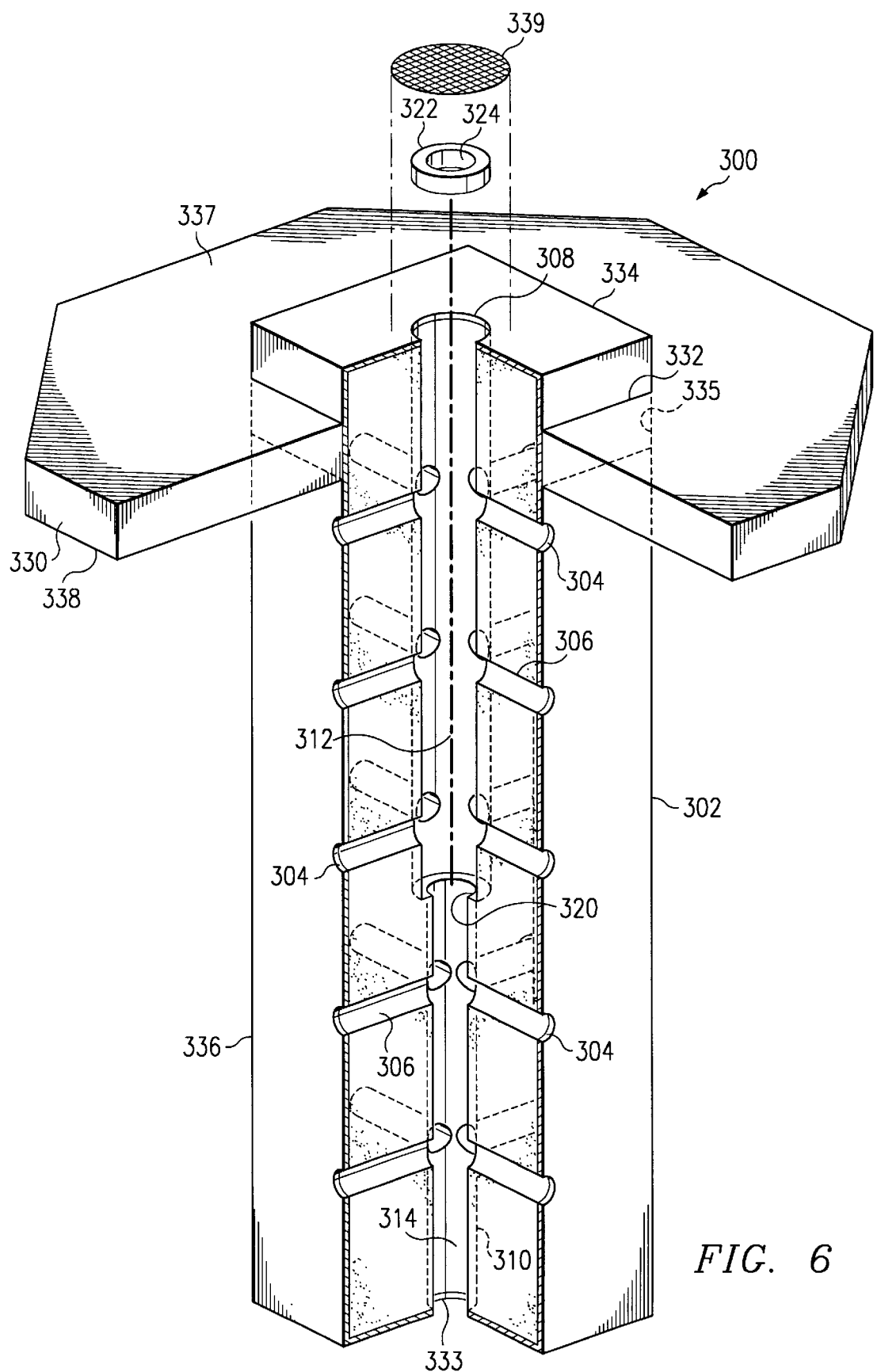
FIG. 6 illustrates a perspective view of an alternative subterranean termite detector according to a second preferred embodiment of the present invention.

FIG. 6 illustrates yet another embodiment of a subterranean termite detector shown at 300. This embodiment differs from detector 10 of FIG. 1a and detector 30 of FIG. 1b in that its multi-diameter vertical cavity comprises two parts, an upper portion 312 having a greater diameter, and a lower portion 312 having a smaller diameter similar to the diameter of the laterally extending passageways 306. Furthermore, this embodiment incorporates an interior reflective disk 322, and an exterior collar 330, and a protective mesh 339.

As in detector 30 of FIG. 1b detector 300 has a single signal port 308, a plurality of lateral ingress/egress ports 304, comprises of bait material such as wood having a square cross section, and is coated with a hard, corrosion resistant termite impregnable coating 302.

As in detector 30 of FIG. 1b the single signal port 308 of detector 300 simplifies the inspection protocol for a given detector by allowing the inspector to concentrate on one specific portion of detector 300, i.e., the single signal port. However, as with detector 30, one may easily vary the number of signal ports, ingress/egress ports, as well as the geometry and architecture of the detector's interior and exterior, including the arrangements of the ingress/egress passageways and the vertical passageways, while remaining faithful to the essential character of the design.

The addition of reflective disk 322 further simplifies the inspection protocol by providing an adjunctive signal device by which an inspector may quickly identify a detector whose vertical passageway 312 contains no obstructions. Disk 322 has a reflective upper surface, such as being mirrored, chromed, or comprised of other reflective material. By directing a source of light, as with a flashlight or some other source, into the vertical passageway 312 so that the light illuminates the unobstructed reflective disk 322, the inspector immediately recognizes the reflected light from the reflective disk 322 as certain evidence that the vertical passageway contains no obstructions and therefore has not been sealed by subterranean termites. This enables the inspector to eliminate such a detector from further consideration after simply sweeping the beam of a light source over the detector. This has the potential to significantly reduce inspection time and inspector fatigue, especially in the early phases of a detector installation when the majority of the installed detectors are free of termites.

By constructing the vertical passageway in two distinct parts, e.g., an upper portion 312 of a larger diameter and a lower portion 314 of a smaller diameter similar to that of the laterally extending passageways 304, several advantages are realized. This construction assures that none of the submerged apertures in the detector 300 will be of a larger diameter than that appropriate for ingress/egress of subterranean termites. This lessens the probability that other organisms, particularly those typically larger than subterranean termites, will enter the detector from the surrounding soil to produce obstructions in the vertical passageway 312 and thereby complicate the inspection process.

The protective mesh 339 is placed over the signal port 308 and glued to the dorsal surface of the detector 300 so that it effectively prevents the introduction of (1) unwanted debris and/or (2) undesirable organisms into the vertical passageway 312. Such introduced objects have been shown, in laboratory and field tests of the present invention, to obstruct all or part of the vertical passageway 312, obscuring the reflective disk 322. The protective mesh 339 is so constructed that it efficiently excludes the introduction of the above described objects into the passageway 312, yet retains sufficient porosity to permit a conspicuous exchange of gases and moisture between the interior of the vertical passageway 312 and the exterior atmosphere surrounding the detector 300, such exchange taking place via the signal port 308 so long as the signal port 308 has not been sealed by subterranean termites. In other words, it being the reality of the conspicuous exchange of gases and moisture, through the signal port 308, effectively presenting a physiological risk of dehydration to the subterranean termite colony foraging within the detector 300, that leads said subterranean termite colony to seal the signal port 308, any significant diminution of this conspicuous exchange must be avoided.

As a consequence of the described utilization of the protective mesh 339, organisms typically larger than subterranean termites are effectively prevented from entering and obstructing the interior of vertical passageway 312 via the signal port 308 where they might complicate the inspection process. The protective mesh 339 also serves a desirable adjunctive function of providing a matrix upon which subterranean termites may construct a more competent seal of the signal port 308 than would be possible in its absence. Such a provision is deemed highly desirable, in that it encourages the subterranean termites to consistently construct a seal of the vertical passageway 312 at the signal port 308 itself rather than more deeply into the vertical passageway 312, and testing in the laboratory and in the field has demonstrated that such seals are more readily discernible by an inspector. It should be noted, however, that any number of other means might also serve this function while remaining faithful to the essential character of the design.

Another advantage of mesh 339 is the observation that subterranean termites are inclined to seal the vertical cavity at the mesh due to its presence. Notably, the termites seal the mesh with purely fecal material, as opposed to any combination of fecal material and another substance, such as soil. This advantageously allows the inspector to apply a substance i.e. chemical to the sealed mesh which reacts with pure fecal material to confirm that the fecal material is in fact that of a subterranean termite, thus confirming the presence thereof. The chemical can be applied with an eyedropper or other delivery device, the reaction of the chemical and the fecal material generating a visual signal to the inspector that is easily ascertainable.

According to another feature of the present invention, the detector 300 can be impregnated with a substance i.e. chemical or material that is detectable in the fecal material of termites by field technicians. This substance helps the technician ascertain whether termites visiting one detector have visited specific other detectors in the area via the detection of the substance. A unique known substance is associated with each of the other known detectors, thereby providing a signature of the associated detector. This substance can be visually ascertainable without external equipment, or could be detected with fluorescent lights or reagents, depending on the substance used.

The junction between vertical passageway 312 and vertical passageway 314 produces an annular support surface or ledge 320 on which the reflective disk 322 rests. An aperture 324 in the center of the reflective disk 322 of the same or similar diameter of vertical passageway 314 permits termites to move freely from one vertical passageway to the other and also serves as a drainage port to allow water from rain, etc., to pass from the upper vertical passageway 312 into and through the lower vertical passageway 314. The lower passageway 314 penetrates the ventral surface of detector 300 at its distal extremity, producing aperture 333.

The addition of the annular collar 330 provides several important advantages to detector 300. The collar 330, which has a hexagonal, circular, oval, square or other profile, may be comprised of rigid or flexible material, and is either permanently and immovably affixed to the detector 300 or, alternatively, frictionally attached in such a manner that its position along the length of the detector 300 shaft 336 is adjustable.

Collar 330 increases the size of the visible dorsal surface area of the detector 300, making said detector more easily seen by an inspector and reducing the likelihood that vegetation will envelope and obscure said detector between inspections. By constructing the collar 330 of an insulating material such as polyolefin foam, which materials are known to limit the transfer of heat, the collar 330 dramatically reduces diurnal and seasonal variations in temperature in the soil immediately adjacent to the detector 300. This moderating effect makes this soil more hospitable to foraging termites and speeds up the detection process.

By constructing collar 330 of a flexible material such as polyolefin foam, which materials are known to retain their initial shape for long periods of time and, when forced to assume another shape thereafter persistently seek to regain their original shape even when forced into another shape for long periods of time; and fitting said collar with a central aperture 334 of a shape similar to but smaller than the cross section of the shaft 336 of detector 300, said aperture penetrating the dorsal surface 337 and ventral surface 338 of the flexible material of collar 330 and producing interior vertical surfaces 335 in the flexible material of collar 330; and thereupon pressing central aperture 334 of collar 330 onto the shaft 336 of detector 300, said surfaces 335 of collar 330 will immediately exert a constant and persistent pressure against said shaft. This constant and persistent pressure will assure that said collar will remain affixed to the shaft 336 of detector 300, in the position at which it was manually placed, despite the action of naturally occurring phenomena such as wind, rain and water flow, snow, ice, and any natural movement of the soil associated with such phenomena. Additionally, this constant and persistent pressure will also prevent removal of the collar 330 by other phenomena such as the suction caused by a lawnmower passing over the detector 300. However, this constant and persistent pressure does not prevent the manual adjustment of the collar 330 to another point along the shaft 336 of detector 300 as may be desired by an installer or inspector.

The aforementioned characteristics of collar 330 confer several important advantages on detector 300. First, they allow the shaft 336 of detector 300 to be inserted into soil before the collar is affixed: this facilitates the assurance of an intimate mating of the surfaces of the detector 300 with a surrounding soil conducive to the foraging of termites, even in the presence of an uncooperative or non-conducive native soil. After an insertion hole has been prepared for the detector 300, soils with a high clay fraction tend to cause large gaps to form between the hole and the sides of the detector. Other soils slump or otherwise creep away from the sides of the detector during installation. Because intimate mating between the soil and the detector has been shown to facilitate the speed of detection, such a mating is highly desirable.

With the collar 330 removed, the detector 300 is inserted into the prepared hole in the soil, and a hand trowel is used to adjust the soil around the detector so that it forms an intimate contact with the shaft 336 of the detector. If the soil is highly plastic and uncooperative as with soils having a high clay fraction, or if the soil in the hole is of insufficient quantity to assure intimate contact over the fall length of the shaft 336 of the detector 300, the soil in the hole may be augmented by the addition of a small amount of suitable soil material scooped up from the surrounding area or by adding a small quantity of potting soil brought to the site by the installer. After the soil has been properly adjusted to insure intimate mating with the shaft 336 detector 300 the collar 330 is pressed onto the shaft 336 of the detector 300 until its ventral surface 338 mates firmly with the underlying soil. This procedure permits the detector 300 to be installed in, and perform effectively as a subterranean termite detector with, soils as shallow as 25 mm (1 inch) and/or many other soils, shallow or deep, whose structure and composition is known to be otherwise inhospitable to termites.

A sealed signal port in a subterranean termite detector of FIG. 1a, FIG. 1b, or FIG. 6 means that termites are feeding or have fed at some time within the respective detector. The texture and character of the seal is distinctive and unambiguous. Therefore, upon observing such a seal, even from a distance, the observer is alerted to the presence of an active subterranean termite colony in that area. The observer then initiates the process of suppressing the termite colony. Two steps are involved in this process: concentrating the termites in one or more specific focal points within the area, and feeding a pesticide to the concentrated termites.

Figure 2:
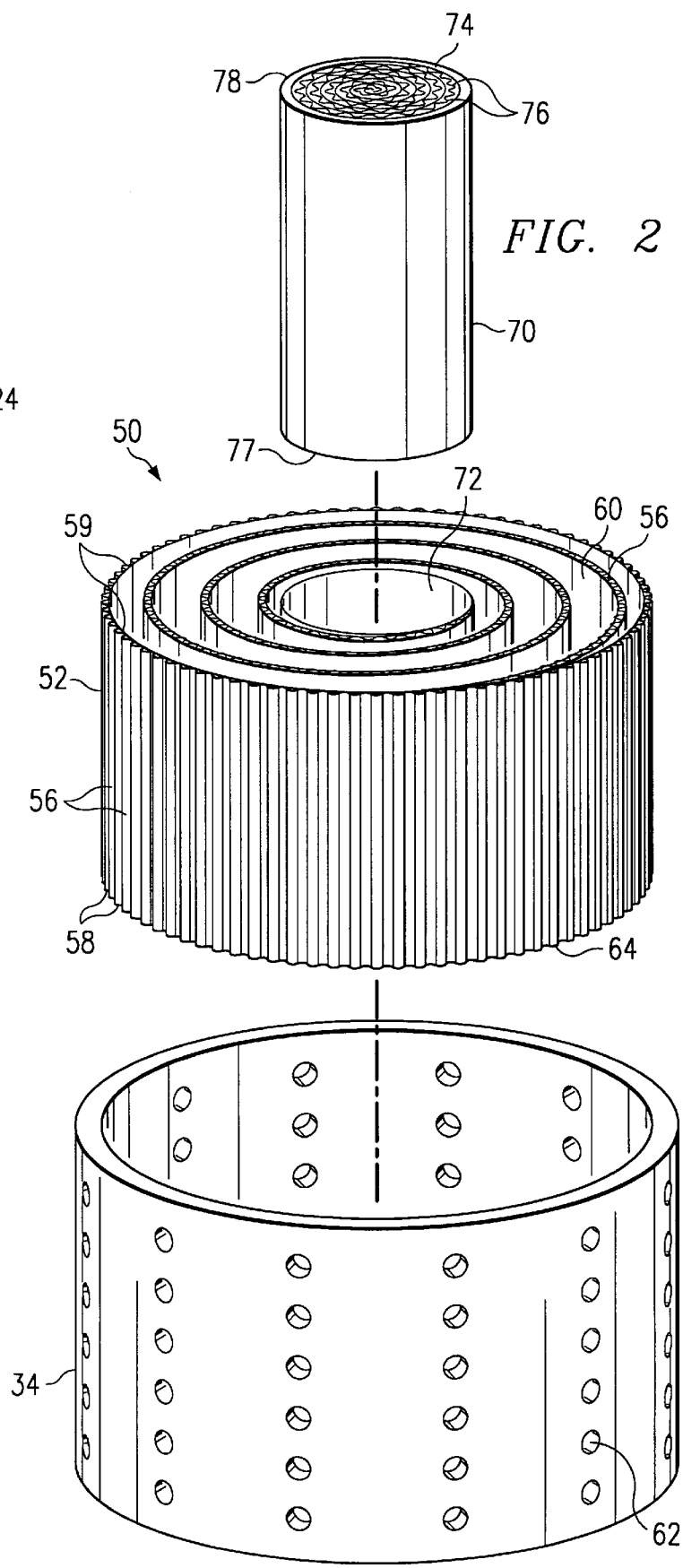
FIG. 2 illustrates an exploded perspective view of one embodiment of a subterranean termite concentrator/feeder combination enclosed laterally by a durable casing, and open on the dorsal and ventral surfaces.

FIG. 2 illustrates an exploded perspective view of a termite concentrator at 50 comprised of a concentrator food mass 52, encased laterally on all sides by a durable casing 54 such as comprised of a plastic material, with the dorsal and ventral surfaces of the concentrator 50 open. In its simplest form, the concentrator food mass 52 may consist wholly of one form of food material attractive to termites, containing one or more simulated termite galleries 56 open at their ventral and dorsal extents 58 and 59, respectively. One useful material readily available for food mass 52 is, for example, a length of single-faced corrugated cardboard coiled into a roll. In the embodiment illustrated in FIG. 2 the single-faced corrugated cardboard is supplemented with additional solid food mass 60, which is combined with the single-faced corrugated cardboard and rolled together with it to form alternating concentric layers of food mass, as shown.

The additional solid food mass 60 may consist of one or a plurality of layers of material attractive to termites for food. The additional food mass 60 may be incorporated into the concentrator solely to add to the food mass of the concentrator. It may also be incorporated into the concentrator to provide specific feeding materials to the foraging termites, including toxicants or growth regulating chemicals.

Lateral casing ingress/egress ports 62 of casing 54 permit foraging termites to enter the concentrator 50 laterally, while the open ventral surface enables foraging termites to enter the food mass 52 directly from the soil. The plurality of flutes 56 in the ventral surface of the single-faced corrugated cardboard 52 serve individually as food mass ingress/egress ports and together as an ingress/egress array. The plurality of flutes 56 on the dorsal surface of the single-faced corrugated cardboard 52 serve individually as signal ports and together as a signal array.

When subterranean termites encounter the concentrator food mass 52 they are instinctively led to explore its extent. In the process of this exploration they will enter one of the ingress/egress ports 58 in the ventral surface 64 of the concentrator food mass 52. The termite is then instinctively led to explore the cavity between the lower ingress/egress port 58 and the associated upper signal port 59, discovering in the process the open dorsal signal port 59 of that individual simulated termite gallery. This discovery will instinctively lead the termite to begin to seal this associated open dorsal signal port 59. As other simulated termite galleries are entered by termites they will also be sealed in like manner, so that as the termite infestation of the concentrator food mass 52 progresses, the signal array 59 in the dorsal surface of the food mass 52 will evidence additional seals.

The sealing of one upper signal port 59 in, for example, the single-faced cardboard is immediately noticeable by a human observer from a distance. Therefore, a human observer is able to easily inspect a series of termite concentrators of this design in the process of a brisk walk around the monitored perimeter. As additional signal ports 59 in the signal array are sealed, the human observer is additionally informed of the extent of the termite infestation within the concentrator food mass 52.

The purpose of the concentrator food mass 52 is to simultaneously provide, in a fixed form, a substantial mass of food and a substantial surface area to feed upon, in order to immediately aggregate a large number of termites therein and maintain that high density of termites for an extended period of time. During that extended period of time, a termite feeder assembly 70 is employed in concert with the concentrator food mass 52 to introduce a measured quantity of toxicant to the same termite population. The termite feeder assembly 70 is removably receivable in the center of the concentrator food mass 52, via a concentric feeder cavity 72. The termite feeder assembly 70 may be advantageously removed and replaced without disturbing the termites feeding in the concentrator food mass 52, and is comprised of a feeder food mass 74. This feeder food mass 74 may be comprised of any material attractive to termites for food, containing one or more simulated termite galleries 76 extending from the ventral surface 77 to the dorsal surface 78 of the feeder food mass 74. In the illustration the feeder food mass consists of a coiled roll of single-faced corrugated cardboard. The feeder food mass may be supplemented with one or more additional forms of material attractive to termites for food, such as partition board and the like.

Because the termite feeder assembly 70 is intimately associated with, centered, and concentric with the concentrator 52, its food mass 74 is accepted by the termites in the concentrator 50 as an extension of the concentrator's food mass 52. The mass 74 of the termite feeder assembly 70 is much less than that of the concentrator 52. Furthermore, the ratio of surface area to mass of the termite feeder assembly 52 is much greater than that mass 74 of the concentrator 70. Consequently, the termites consume the food material 74 in the feeder assembly 70 relatively rapidly, while consuming the food material 52 in the concentrator more slowly. When the food material 74 in the feeder assembly 70 is depleted, the termites continue to consume the food material 52 in the concentrator 50. Thus a high density of termites is maintained in the concentrator irrespective of the status of the food material 74 in the feeder assembly 70. The food material 74 in the feeder assembly 70 may be replenished as needed without affecting the density of termites in the concentrator 50.

Figure 3:
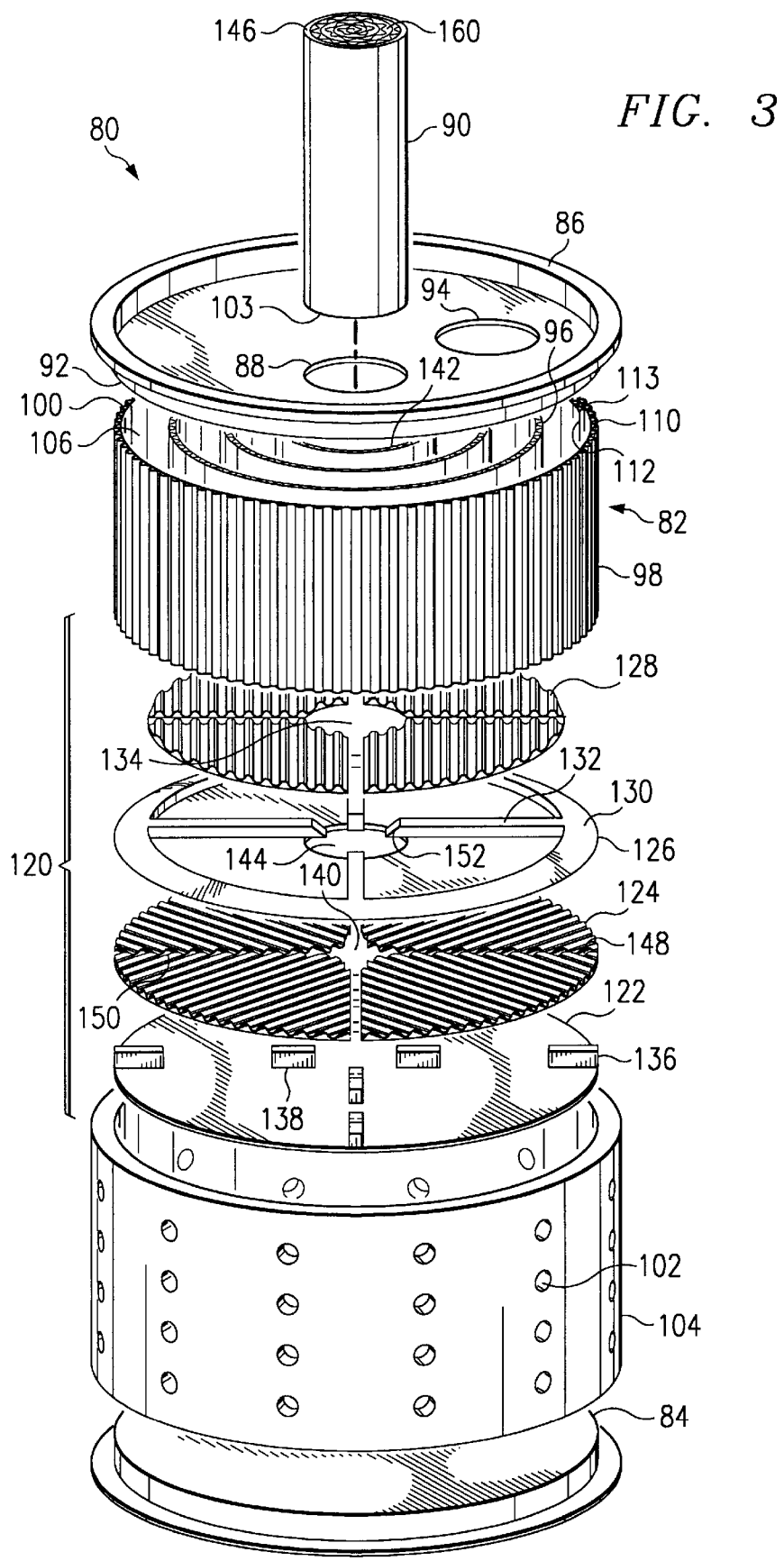
FIG. 3 illustrates an exploded perspective view of a further embodiment of a subterranean termite concentrator/feeder combination enclosed laterally as in FIG. 2, but further including a concentrator dorsal cap, a concentrator/feeder ventral cap, a director assembly, a concentrator bait mass barrier and a supportive feeder receiver casing.

FIG. 3 illustrates another embodiment of the subterranean termite concentrator 80 having a feeder/receiver 82. In this embodiment, the ventral surface is closed with a ventral cap 84, and the dorsal surface is partially closed with a dorsal cap 86. Dorsal cap 86 has a central aperture 88 through which a removable feeder assembly 90 is inserted into a central concentric opening 92 of concentrator feeder/receiver 82. The dorsal cap 84 also has at least one observation aperture 94 to allow visual inspection of a proximate portion of the signal array in the concentrator interior food mass 96.

The concentrator food mass assembly 82 of FIG. 3 is similar to the concentrator food mass assembly 52 of FIG. 2 except that it is divided into two physically separate food masses. The perimeter portion 98 of food mass 82 containing simulated termite galleries 100 serves to attract the termites entering the concentrator assembly 82 via the lateral ingress/egress ports 102 in the durable termite impregnable casing 104. The interior bait mass portion, comprised of a concentric food mass 96 containing simulated termite galleries 100, and a supplemental concentric solid food mass 106, constitutes the bulk of the food mass 82 of the assembly. A perimeter barrier strip 110 separates the perimeter food mass portion 98 from the interior food mass 96 and supplemental food mass 106.

The perimeter barrier strip 110 is comprised of a length of flexible, durable, non-repellent but termite resistant material. It has a vertical dimension similar to that of the perimeter food mass portion 98. Its longitudinal dimension has sufficient length to not only circuit the circumference of the concentrator food mass assembly 106, but to further provide a slight interior overlap at 112.

The perimeter barrier strip interior overlap 112 communicates with the outer extremity of the perimeter barrier strip 110 via a perimeter barrier strip seal 112, comprised of a rigid durable material having a thickness equal to that of the perimeter food mass 82. The perimeter barrier seal attaches both extremities of the perimeter barrier strip 110 together with a durable adhesive, thereby completing a closed barrier that termites are not able to penetrate.

The purpose of the perimeter barrier strip 110 is to prevent subterranean termites from gaining access to the bulk of the concentrator food mass 82 directly from the perimeter of the bait mass itself. This barrier 110, along with a termite director assembly 120, assures that all termites feeding on the concentrator food mass 82 pass in close proximity to the termite feeder ingress/egress array 103 en route to the concentrator's interior food mass 96 and supplemental food mass 106. By directing the termites in this manner a measure of preference is granted to the food mass of the termite feeder over that of the termite concentrator. This preferential treatment of the termite feeder insures that a portion of its food mass will be consumed by most if not all of the termites feeding within this embodiment.

The termite director assembly 120 is placed beneath the ventral surface of the concentrator food mass 82. It is comprised of a lower director disk 122, a lower director food mass 124, an upper director disk 126, and an upper director food mass 128. The upper director disk 126 mates to the concentrator perimeter food mass 98 as the latter is pressed down at its outer edges to contact an adhesive material coating the outer beveled mating surface 130 of the upper director disk 126. The architecture of the outer beveled mating surface 130 insures that the lower surfaces of the concentrator perimeter food mass 98 come into direct contact with the lower food mass 124.

A plurality of upper director disk lateral spacers 132 radially extend and prevent the concentrator's interior food mass 96 and supplemental food mass 106 from collapsing onto the upper director food mass 128. This assures that foraging termites entering via an upper director food mass central aperture 134 will have sufficient space to fully explore the concentrator's interior food mass 96 and supplemental food mass 106. The lower director disk 122 is provided with peripheral spacers 136 and interior spacers 138 to insure the dimensional integrity of the space provided between the upper director disk 126 and the lower director disk 122. In this space is placed the lower director food mass 124, which functions to conduct exploring termites from their peripheral entry points, where the concentrator peripheral food mass 98 contacts the lower director food mass 124, to the central aperture 140 of the lower food mass 124.

The feeder receiver opening 92 extends down through a feeder receiver casing 142, through the central aperture 134 of the upper director food mass 128, and through a central aperture 144 of the upper director disk 126. The interior spacers 138 of the lower director disk 122 provide the lower abutment for the feeder assembly 90 to rest upon. Here the feeder food mass ingress/egress array 103 comes into intimate and direct contact with the lower director food mass 33 at its central aperture 140. This assures a continuous and unbroken food mass for the termites to explore from their first contact with food material of the concentrator perimeter food mass 82 to the feeder food mass ingress/egress array 103.

The inside diameters of the central aperture 134 of the upper director food mass 128, and of the central aperture 144 of the upper director disk 126 are greater than the outside diameter of a feeder assembly casing 146. The difference between these diameters is sufficient to allow foraging termites to comfortably pass, from the lower director food mass 124, to the upper director food mass 128. As shown in the illustration, the lower director food mass 124 is divided into two or more sections. The gap 128 between each section serves, at the central extremities 150 of each section, as ancillary access passageways between the lower director food mass 124 and the upper director food mass 128. The upper director then provides exploring termites full access to the concentrator interior food mass 96 and the supplemental food mass 106. Proximal ends 152 of each upper director disk lateral spacer 132 project radially inward beyond the upper director disk central aperture 144. The inward projection of these proximal ends 152 causes them to contact the outer casing 146 of the feeder assembly 90 as it is inserted or withdrawn in the feeder receiver 92. The proximal ends 152 insure that the difference between the inside diameters of the central apertures 144 and 134 and the outer diameter of the feeder assembly casing 146 is maintained consistently during and after insertion of the feeder assembly 90. The extended proximal ends 152 of each upper disk lateral spacer 132 are beveled to provide for a smooth reception of the feeder assembly 90.

FIG. 4a illustrates an exploded perspective view of the termite feeder assembly 90 of FIG. 3 wherein a feeder food mass assembly 156 is wholly comprised of nontoxic material, and thus not in need of tamper-resisting attachments. Non-toxic feeders may be inserted into the concentrator feeder receiver 92 of FIG. 3 when (1) the concentrator is initially installed near a signaling detector 10 or 30, or (2) for scientific purposes to serve as removable termite specimen collectors. In the embodiment of FIG. 4a the feeder food mass 156 is comprised of single-faced corrugated cardboard 160, which is enclosed within the durable casing 146, with the ventral aperture 162 and the dorsal aperture 164 of the feeder durable casing 146 open and unobstructed. Vertically extending flutes 166 of the single-faced corrugated cardboard 156 serve together as a signal array at the dorsal surface 160 and as an ingress/egress array at the ventral surface 103. The feeder food mass 156 of this embodiment may be easily pressed out of the durable casing 146 by exerting pressure on the feeder food mass at either the ventral aperture 162 or the dorsal aperture 164 of the feeder assembly 90 to facilitate removal of termite specimens.

FIG. 4b illustrates an exploded perspective view of an embodiment of a termite feeder assembly 170 wherein a feeder food mass assembly 172 is comprised of two or more materials laminated together, one or more of which needs to be insulated from human exposure by tamper-resisting attachments. In the illustrated embodiment, a length of non-toxic single-faced corrugated cardboard 174 having vertically extending flutes 175 serving as signal ports is laminated together with a supplementary toxicant-containing food material 176.

The vertical dimension of the supplementary toxicant-containing food material 176 is less than that of the single-faced corrugated cardboard 174. This results in the latter overlapping the former, on both vertical extremities, when a lateral midline 178 of the single-faced corrugated cardboard 174 and a lateral midline 180 of the supplementary toxicant-containing food material 176 coincide. The supplementary toxicant-containing food material 176 is attached to the single-faced corrugated cardboard 174 at its centermost extremity 180 with an adhesive strip to insure that the lateral midlines of both materials remain coincident as they are rolled together into a laminate form. The laminated food mass is then inserted into an opening 181 of a durable casing 182 so that only the dorsal and ventral surfaces of the single-faced corrugated cardboard 174 are subject to human exposure.

Feeder end caps 184 and 186 are permanently attached to the dorsal and ventral ends of the durable feeder casing 182, by inserting end cap lateral reinforcements 188 into respective durable casing slots 190. Knife cuts 192 in the dorsal and ventral ends of the feeder food mass 172, consistent with the location of the durable casing slots 190 allow the end cap lateral reinforcements 188 to penetrate for some distance into the feeder food mass 172. Permanent attachment of the end caps is accomplished using adhesives or heat welds that fuse the end caps to the durable casing in a tight, permanent and irreversible bond. The permanently attached end caps 184 and 186 prevent non-destructive tampering with the feeder bait mass assembly 172.

Figure 5:
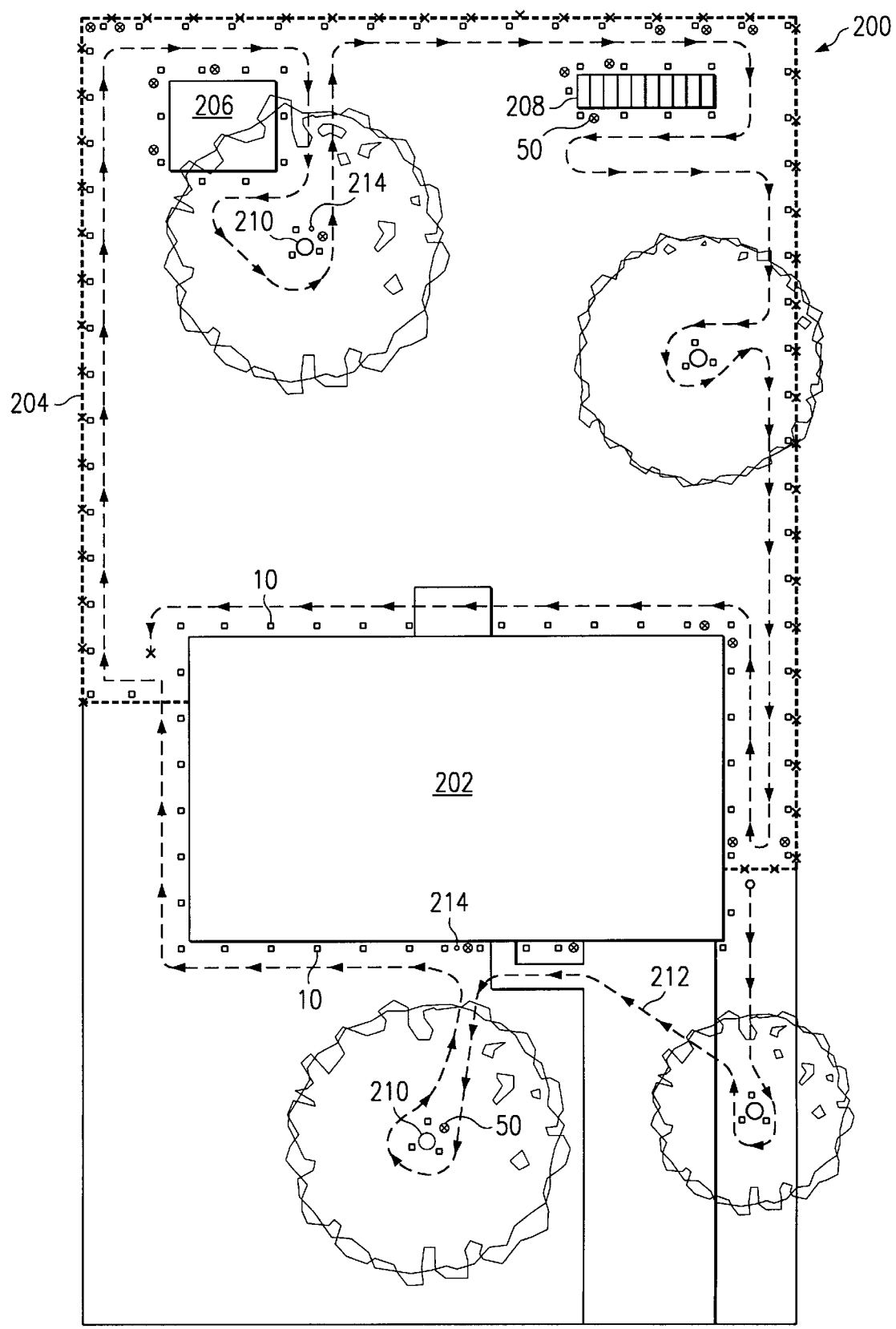
FIG. 5 illustrates a plan view of a hypothetical residential plot containing a residential structure, a wood privacy fence, a detached shed, a wood pile, and several trees, around which detectors and concentrator/feeders of the present invention have been placed in accordance with the instructions provided herein.

FIG. 5 illustrates a method 200 of using the embodiments of the subterranean termite detectors, concentrators and feeders depicted in FIGS. 1–4 in a hypothetical single-family residential setting. The site plan of FIG. 5 includes a single story residential structure 202 of approximately 180 m$^2$ (1,890 ft$^2$) of space under roof, with a wooden privacy fence 204, a detached shed 206, a woodpile 208, and four trees 210.

Termite detectors 10, 30, or 300 are placed at regular intervals around the perimeters of the residential structure 202, the detached shed 206, the woodpile 208, the wooden privacy fence 204 and each of the four trees 210. In this hypothetical installation, the termite detectors 10, 30, or 300 are placed at nominal intervals of 1.5 m (≈5 ft.) around all but the four trees. Three detectors are installed around the base of each tree. A total of 115 detectors are required for the hypothetical installation.

A detector inspection circuit 212, that would allow an inspector to pass close by every one of the 115 installed detectors, would have a length of approximately 180 meters (591 ft.). At an uninterrupted walking speed of 1.6 km/hr (1 mph) the inspection circuit 212 would be completed by an inspector in 6 minutes and 42 seconds. In field exercises, inspectors were found to be able to maintain an uninterrupted walking speed of as much as 3.2 km/hr (2 mph) while accurately inspecting the detectors of this design. However, a slower walking rate may be more appropriate when inspecting an unfamiliar site, or a familiar site that is visited only once every one to three months.

The following protocol is subject to significant variation depending on the situations encountered at a specific site. However, the general protocol described has been tested in a number of field sites with satisfactory results.

As certain of the installed termite detectors 10, 30, or 300 signal the presence of active termites, termite concentrators 50 or 80, fitted initially with non-toxic feeder assemblies 90, are placed in close proximity to the detectors 10 or 30. Each concentrator 50 or 80 is first provided with a non-toxic feeder assembly 90 such as that of FIG. 4a. This non-toxic feeder assembly 90 remains in place until perhaps 50% of the feeder's signal array has been sealed by the termites and part of the signal array 103 of the concentrator interior food mass has been sealed indicating the termites are infesting the concentrator food mass 52 or 82 as well. At this point the non-toxic feeder assembly 90 is removed and replaced with a toxicant-containing feeder assembly 170 such as that of FIG. 4b. The infested non-toxic feeder assembly 90 is not discarded, but is placed in a sealed container for transport to a laboratory where, for example, the termites within may be measured to determine their density and weight, and examined microscopically to identify the species of termite involved. The collected termites may also be used in simplified mark-release-recapture protocols to obtain an estimate of the termite colony's population, and to determine if multiple colonies may be involved at the site.

When the termites begin feeding within the toxicant-containing feeder assembly 170 of FIG. 4b they will progressively seal the upper individual signal ports 175 of the feeder's signal array until all of the signal ports of the signal array are sealed. As the bait mass 172 of the toxicant-containing feeder assembly 170 is consumed by the termites, its internal structural integrity will be progressively lost and the bait mass 172 will begin to noticeably slump. When the bait material 172 has a noticeable slump the toxicant-containing feeder assembly is replaced with a fresh toxicant-containing feeder assembly 170. This process is then repeated as long as the termites continue to seal the signal array 175 of the fresh toxicant-containing feeder assembly 170 and the bait mass 52 or 82 continues to develop a noticeable slump.

When the termite colony has been successfully suppressed, the termites will fail to seal the signal array 175 of a freshly installed pesticide-containing feeder assembly 170. Alternatively, a declining termite colony will fail to consume sufficient quantities of the feeder assembly's food mass 52 or 82 to cause the latter to slump to the point where it should be replaced. When either of these conditions is observed for more than 30 days, except when the soil temperature drops to or below 15° C. at any time during a given 30 day period, it may be assumed that the attacking termite colony has been suppressed.

The apparent suppression of termites is not taken for granted but is always tested for corroborative evidence. Such evidence is acquired by leaving the collector/feeder assembly 170 undisturbed, reactivating the nearest termite detector 10, 30, or 300 and inserting a supplemental termite detector 214 nearby.

Figure 1C:
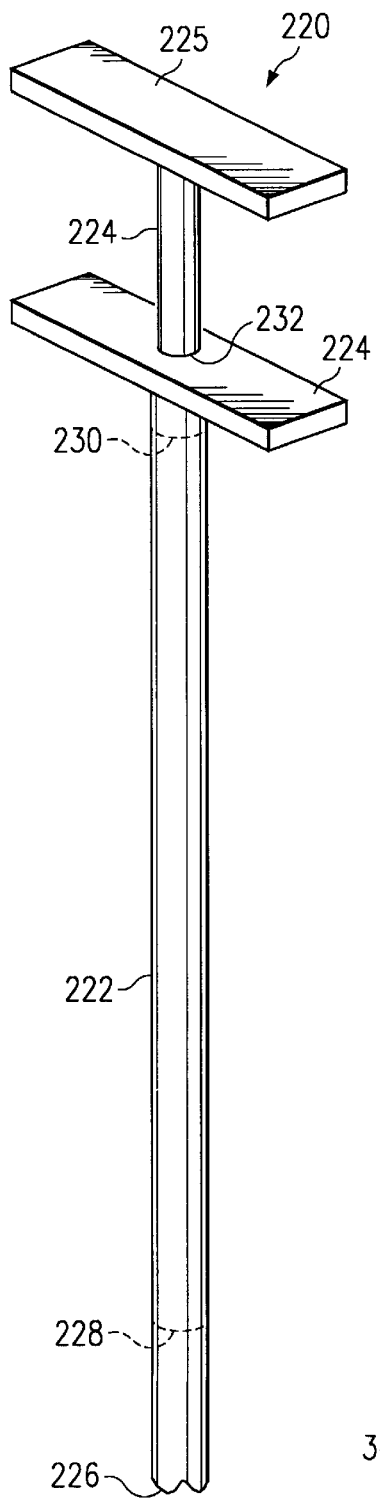
FIG. 1c illustrates a perspective view of a probe used to remove the seal created by termites across the signal port of the subterranean termite detector.

Reactivation of the nearest termite detector 10, 30, or 300 is accomplished using a detector probe 220 depicted in FIG. 1c. The detector probe has a hollow tubular shaft 222 and a retractable plunger 224. Shaft 222 is inserted gently into the detector signal port 18 of FIG. 1a or signal port 32 of FIG. 1b while slowly rotating the hollow tubular shaft 222 by means of a turnbuckle 224. Serrated teeth 226 at the distal end of the hollow tubular shaft 222 aid in cutting through the seal of the signal port. After the hollow tubular shaft 222 of the detector probe 220 has been inserted into the detector signal port at least as far as a depth indicator 228, but preferably as far as an upper depth indicator 230, the probe is carefully withdrawn.

After the probe 220 has been fully withdrawn from the detector 10, 30, or 300 any debris that has collected in a cavity 232 of the hollow tubular shaft 222 is removed and inspected. By inserting plunger 224 into the upper end of the cavity 232 of the hollow tubular shaft 222 and pressing gently downward on the contents of the cavity 232, the contents are caused to be discharged through the distal end of the hollow tubular shaft 222.

A careful inspection of the discharged material may reveal the presence of recognizable termites, confirming that termite colony elimination is incomplete. A vigorous termite population will also re-seal the signal port of the detector within hours or days. If this occurs, suppression of the termite colony is incomplete and the feeder assembly 170 of the nearby concentrator/feeder 50 or 80 should be replaced with a fresh feeder assembly.

In the event that a careful inspection of the discharged material from the probe's hollow tubular shaft 222 reveals no signs of recognizable termites, and/or the newly reopened signal port of the detector 10, 30, or 300 remains open for at least two weeks, except when soil temperatures drop to or below 15° C. at any time during the preceding 30 day period, it is likely that a successful suppression of the termites feeding at this concentrator/feeder 50 or 80 has been achieved. To further test this a supplemental detector 214, identical to the detector 10, 30, or 300 installed nearby, is placed near the concentrator/feeder assembly 50 or 80.

The trio of the newly re-opened detector 10, 30, or 300 the concentrator/feeder assembly 50 or 80 exhibiting a partially unsealed signal array or a feeder bait material that has not slumped, and the newly installed supplemental detector 214, are inspected thereafter on a regular basis for signs that termite activity has resumed at that location. If no signs of termite activity are found over the next six months, the concentrator/feeder assembly 50 or 80 is removed and discarded, while leaving the detector 10, 30, or 300 and the supplemental detector 214 in place. These detectors are subsequently inspected on a regular basis for signs that termite activity has resumed at that location.

Field Study Validation of the Present Invention

Experiments were conducted in the field and in the laboratory to develop and test the present invention. These experiments grew out of a field collection effort, initially conducted to obtain live termite specimens from a variety of field locations. In the process of this collection effort, it was possible to observe the behavior of a wide variety of subterranean termite species within a broad range of habitats. Initial collection efforts also pointed out certain inefficiencies, whose correction culminated in the design of an extremely simple termite detector. The detectors 10, 30, or 300 when deployed sequentially in close proximity to one another, have been shown to be capable of accurately pinpointing the geographic extent of subterranean termite foraging zones.

This development then propelled the collection program forward to the design of the relatively simple and efficient termite concentrator 50 and 80 capable of producing an aggregation of large numbers of foraging termites within specific nodes of the previously defined termite foraging zone. Although the original object was to collect termites for laboratory study, it became clear that these detection and concentrating devices would also serve well as part of a system whose object would be the suppression of termite colonies. Hence the instant invention.

Initial field collection efforts consisted of selecting ≈60 sites within the state of Texas where subterranean termite behavior could be studied in detail. These sites were situated within a region bounded by Dallas on the north, San Antonio on the south, Brownwood on the west, and Mount Pleasant on the east (an area of approximately 62,500 square miles). These sites represent a broad range of ecological habitats.

The soil types in this area range from heavy clay, sandy loam, alluvial silt and various combinations of these. Climate ranges from arid semi-desert, to wet coastal tropics. It is believed that by studying the behavior of the termites found at these 60 sites, an understanding of termite biology, applicable to much of the continental United States of America, could be obtained.

Prototypical subterranean detectors similar to the design depicted in FIG. 1a were prepared using unpainted softwood lumber cut in rectangular blocks measuring 15×5×2.5 cm, with a rectangular dorsal surface measuring 5×2.5 cm, and a pointed ventral end. Two lateral horizontal cavities, 3 mm in diameter, were drilled 25 mm and 50 mm from the dorsal edge on each of the two narrower sides, along the midline of the longitudinal axis of each narrow side parallel to one another. These horizontal cavities, which served as subterranean termite ingress/egress ports, were drilled through the center of the longitudinal axis of the block and continued beyond this intersection until they penetrated the opposing side of the block. Two parallel vertical cavities, serving as signal cavities 6 mm in diameter, were then drilled in the dorsal 5×2.5 cm surface, along the longitudinal axis of the block, through the proximal horizontal cavity and onward to the distal horizontal cavity. These vertical cavities terminated at their intersection with the distal horizontal cavity.

The block thus configured contained a man-made gallery system consisting of two parallel latitudinal 3 mm galleries with 4 external entry/egress ports. Two longitudinal 6 mm signal cavities joined both latitudinal galleries to two external 6 mm diameter signal ports.

Blocks of this design were then inserted into the soil of several cultured termite colonies in the laboratory. The 4 entry/egress ports were submerged in the soil with the top signal port of the block pointing straight up.

The termites from these cultured colonies were observed to enter these blocks via the 3 mm horizontal apertures within minutes, as evidenced by observing them crawling around in the interior of the 6 mm vertical cavity. This initial activity on the part of the termite workers appeared to follow a generalized procedure of exploration that was postulated to be a necessary step in preparation for acceptance of the galleries as feeding chambers. In other experiments it was noted that the exploration procedure would be protracted or shortened depending on the complexity of the chamber. This suggests that the exploration procedure is carried out as a means of determining how the chamber might be secured in order to assure an appropriate level of safety to the termite foragers.

After exploring the interior and exterior of the block, the termite workers would begin hauling in materials from the soil surrounding the block, through the horizontal galleries and into the vertical cavity. This material was then used to construct a complete seal of the 6 mm aperture of the block, either immediately at or within 3 mm of the aperture proper. In some cases the seal was completely closed within 40 minutes after the block was inserted into the soil of the cultured termite colonies in the laboratory.

These experiments proved that the termites would seal the visible aperture of the monitoring device immediately upon entering the device. However, it was noted that in some instances, the termites stopped short of entering the device for a time even though feeding commenced on its external surfaces. This behavior was noted to occur more frequently with certain termite colonies, and less frequently with others. Other researchers have noted this behavior with termites of the species *R. virginicus*, but not with other species. Close examination of those instances occurring in conjunction with field testing of the instant invention showed that the termites had built protected galleries to and upon the exterior surface of the detector. When they encountered an exterior aperture into the interior ready-made galleries of the block, they sealed them while they fed on the external cellulose surfaces.

In other words, some subterranean termites maintained a closed gallery system by temporarily excluding the interior of the detector from their foraging area. Although all of these termites eventually did enter the interior of the detector and seal the signal ports, a time lag sometimes occurred between commencement of the active infestation and the presence of overt evidence of the infestation. The signal port in this configuration only annunciated the presence of termites when the termites were ready to commence an active infestation of the detector's interior.

These findings led to experimentation with exterior coatings on the detector to prevent the termites from consuming the cellulose on its outer surface. It was postulated that such a coating would cause them to immediately enter the interior of the detector, resulting in an immediate sealing of the signal port. As a result of these experiments coating materials unable to withstand submersion in moist soil for lengthy periods of time were ruled out.

One particular coating material, UGL DRY LOK Masonry Waterproofer, manufactured by United Gilsonite Laboratories in Scranton, Pa., was found to produce a durable, competent coating that could be shaped and drilled after drying and that held up well in moist environments. This material is available in both oil-based and latex-based formulations. The oil-based formulation was not tested because of the anticipated repellent effects of the oil on foraging termites. Extensive experiments were then conducted with detectors coated with the latex-based formulation, both in the laboratory and in the field.

It is believed that any number of other coatings will be found to be equivalent or superior to the latex formulation of the UGL DRY LOK coating, and experiments with other coatings are in process. However, this coating has been used with several prototype subterranean termite detectors with satisfactory results. In the laboratory, cultured colonies of the species *R. virginicus, R. hesperus, R. flavipes*, and *R. tibialis* entered the detectors coated with this material through the entry/egress ports within minutes and sealed the signal ports. As before, the signal ports were often sealed within 40 minutes following insertion of the coated detector in the soil containing the cultured termite colony.

Subsequent field trials with coated termite detectors involved placing the detectors at the test sites near uncoated detectors with sealed signal ports. The termites generally entered these detectors within a matter hours or days, as evidenced by their sealed signal ports. Because the UGL DRY LOK coating is bright white in color, and the void left by an open signal port is dark, an inspector can quickly discern when the signal port has not been sealed. This allows the inspector to reliably inspect a series of unsealed detectors quickly. In field tests with this detector, a reliable inspection round could be performed at the baseline speed (3.2 km/hr, or 2.0 mph), which is typical of a relatively brisk walk, if visualization of the detectors was unobstructed. The contrasting color of the detector's coating make them easy to spot even in relatively tall grass.

Continued experimentation with the coated detectors suggested that a somewhat larger 7 mm signal port was easier to visualize for some observers when viewed from a standing position. Subsequently, a large number of prototype detectors were prepared with the larger 7 mm (0.281 inch) signal port, and laboratory and field tests were then carried out with them. These tests were so successful that they suggested an even larger signal port would work as effectively while also further facilitating the inspection process. The signal port was then increased to 9.5 mm (0.375 inch).

Laboratory and field testing of detectors with the larger 9.5 mm signal port were as successful as those with the smaller signal ports; these tests indicated that signal ports of this size did not deter any of the subterranean termites involved from occupying the detector or sealing the signal ports. However, the larger signal port was demonstrated to have the positive effect of reducing the time needed to identify a null detector.

Several different sizes of wood blocks for the detector were also evaluated, both in the laboratory and in the field. A more substantial block, with a square 5×5 cm cross section, retaining the original 15 cm length but eliminating the pointed ventral end, was finally settled upon for all subsequent experiments. Although a pointed end could be provided to facilitate forcible insertion of the block into the soil, all experiments with this detector have utilized a block without this feature because forming the pointed end reduced the quantity of food material available to the termites and added unnecessarily to the cost of the fabrication process. Also, forcible insertion of the detector into a hard, dry soil could damage the detector's coating and, as had been noted with other prototypes, possibly fracture the block.

Field trials with this detector have proven its effectiveness at detecting the presence of subterranean termites. In one field experiment, these detectors were installed around four approximately 9-year-old residential structures, built adjacent to one another, in Round Rock, Tex. The detectors were installed approximately 15–20 cm from the edge of the foundation, at intervals of approximately 1.5 m. Although one of these structures had been treated for termites two years earlier, the others were not known to have had active termites at any time since their construction. Within two weeks following installation approximately 15% of the detectors at each structure had sealed signal ports, indicating active termites. Subsequent analysis of the signaling detectors proved that active termites were, in fact, present in each one.

Detectors were also installed around the perimeter of a residential structure in Keene, Tex. This home had no prior history of termite infestations. One week later, 13% of these detectors (4 of 30) were found to have sealed signal ports. Similar results were obtained when detectors were installed around the perimeters of several nursing facilities with no history of termite infestations. These examples suggest that the detectors will function well when installed for strictly precautionary purposes.

Detectors were also installed in the immediate vicinity of mud tubes found on the foundation of nursing facilities in several locations in Texas. In each instance, the signal ports of each detector was found to be sealed when the detectors were inspected two to four weeks later. When the mud tubes on the foundations were removed, the termites did not always rebuild them, preferring instead to concentrate on the food provided in the detectors. In those cases where the mud tubes were rebuilt, the application of a small quantity of liquid synthetic pyrethroid to the mud tube would cause that tube to be abandoned. Several months later, these mud tubes had not been rebuilt, but active termites were still found in the detectors. This suggests that the detectors may be used to re-direct termite activity away from an infested structure and thereby mitigate termite damage to the structure while toxicants are being fed to the termite colony to suppress them.

As testing with the various prototype detectors described above continued, it became apparent that much attention needed to be placed on quickly confining null detectors. A null detector is defined here, as one that does not display any indication whatsoever that termites are present. With these detectors, the simplest example of a null detector is one that contains no obstruction of the vertical passageway below the signal port. Rapidly confirming a null detector is important because, especially in the early stages of a monitoring program at a given site, most or all of the detectors will be null. Ideally, confirmation of a null detector should take considerably less time than would the examination of a detector whose vertical passageway is obstructed and whose obstruction may, therefore, represent termite activity.

In recognition of this need a number of alternative methods of confirming the null detector were tested using detectors following the design shown in FIG. 1b. The central vertical passageways in these detectors did not fully penetrate the detectors' ventral surfaces, but had a terminal seat on which a small disk of reflective material could rest. A number of different types of reflective material were then cut into small disks and inserted into this vertical passageway. One object of this experiment was to measure the limit of off-axis viewing that would still permit an individual 1.68 m (5 ft. 6 in.) tall to view at least some visible portion of the reflective disk. With a 7 mm signal port, and a vertical passageway measuring 14 cm (5.5 in.) deep, this limit was found to measure 6 cm (2.375 in.). In other words, while this individual remained within a circular area 12 cm (4.75 in.) in diameter above the detector, the center of this area being defined by the long axis of the detector shaft, the inspector would be able to observe at least part of the light reflected off of a reflective disk placed at the distal end of the vertical shaft of the detector. This small area was judged to be too confining, as other experiments had suggested that an inspector would commonly seek to examine the interior of the detector while standing as much as 15 cm (6 in.) from the vertical axis of the detector. At this point, 15 cm was arbitrarily established as the minimum limit for off axis viewing of the reflective disk.

Experiments then continued, testing varying diameters of signal ports and vertical passageways, as well as varying depths of vertical passageways. These experiments led to the finding that a detector with a signal port and vertical passageway diameter of 9.5 mm, and a vertical passageway depth of 8 cm (3.125 in.) would permit off axis viewing of the reflective disk of as much as 18.6 cm (7.3 in.). Since this exceeded the established minimum, it was judged to be acceptable and experiments were then conducted with detectors of this design, eventually culminating in the design of detector 300 as depicted in FIG. 6. As shown in this figure the vertical passageway does not terminate at the reflective disk but extends below the reflective disk, albeit with a smaller diameter, through an aperture in the reflective disk until it penetrates the detector's ventral surface at its distal end. This permits full communication with the laterally extending passageways below the reflective disk so that termites are able to travel freely from the lower portion of the detector to its upper portion. It also provides for drainage of the interior of the detector through the aperture in the reflective disk, and on through the length of the smaller diameter vertical passageway in the lower portion of the detector.

A number of different reflective materials were tested for use in these detectors. One of these was a 3M product referred to by the manufacturer as "Diamond Grade" reflective tape. This material is available in five different colors. Experiments continue with these and other materials to determine which are best suited for this application.

As these experiments continued it became more and more apparent that the need existed for a protective collar around the detector shaft where that shaft was submerged into the soil. Detectors placed flush with the soil surface were often obscured by the fresh vegetation growth that naturally occurred between inspections, so that it became necessary to search for them before an inspection could take place. A collar was viewed as a means to increase the surface area of the detector to make it more visible and to limit the growth of vegetation in the immediate vicinity of the detector.

Experiments with rigid collars constructed of rigid plastics were only moderately successful. Rigid collars that are separate from and simply forced over a detector shaft are typically not faithful to their original shape for very long. Consequently, such collars tend, over time, to conform to the shape they are forced to assume and become loose in the process. Wind, water and other natural conditions are then able to easily dislodge them. When lawnmowers are passed over detectors with rigid collars that have been in place for several weeks, the vacuum created beneath the lawnmower blades often dislodged the collars with undesirable results.

For these reasons, experiments involving collars eventually were directed toward the use of a flexible, somewhat thick material that would faithfully return to its original shape even after being forced into another shape for lengthy periods of time. A number of materials meet these criteria One in particular, polyolefin foam, has been found to perform well. However, it is likely that many other materials will also perform as well or better for this application.

Specimens of polyolefin foam of varying density and thickness were tested as collars on detectors of the design shown in FIG. 6. In the process it was determined that collars of this material remained flexible and faithful to their original shapes after long periods of exposure to sunlight, rain, and wide temperature swings.

The detector described above has the singular function of detecting and annunciating the presence of termites. It is not designed to concentrate the detected termites in large quantities, or to feed those termites a toxicant, although it would be possible to use it in either or both roles by, for example, impregnating the detector's food source with various toxicants. The hard corrosion resistant exterior coating would provide a measure of tamper resistance. In the case of relatively small termite infestations, as may occur with certain species of subterranean termites, it may be appropriate to use these detectors in this fashion. However, when the species of termite, and the approximate size of the associated termite colony, are not known, it would be more prudent to assume the termite colony to be relatively large and at least prepare to treat the colony aggressively. Doing so requires the use of additional devices, functioning essentially in the role of separate bait servers, as described below.

Ideally a bait server will accomplish two objectives: (1) reliably concentrate termites, and (2) efficiently feed them toxicants. Reliable concentration requires that the concentrator component of the bait server to be capable of attracting large numbers of termites quickly, and of maintaining a high density of termites within it for a reasonable period of time. Reasonable time, in this context, means as long a period as necessary to accomplish the desired results. Efficient feeding of toxicants requires that the toxicant feeder component of the bait server also be capable of attracting large numbers of termites quickly, and feeding them a toxicant for as long as needed to suppress the termite colony.

These two objectives cannot reasonably, or economically, be accomplished using a single, multifunctional entity. The size of a termite colony cannot presently be ascertained without executing a series of complicated procedures (e.g., mark-release-recapture techniques). The costs associated with these procedures, and the scarcity of trained personnel familiar with them, make them unsuitable for widespread use. This could change, as knowledge about termite biology increases and new methods of estimating colony population simplify those procedures.

For the time being, it is not generally possible to know, beforehand, how much toxin must be distributed to a given termite colony in order to achieve an acceptable level of suppression. This means that the toxicant feeding component of the bait server may need to supply only a small amount of toxin (to a small colony) or a larger amount (to a larger colony). The only proper way to deal with this variable is to supply the toxicant to the colony in measured increments as needed until the acceptable level of suppression has been reached. This can only be done with a bait server that allows for additions to the toxicant load, on demand, according to the dictates of the specific situation involved.

At the same time, it is well known in the field of termite biology that disturbing the termite concentrator component of the bait server during the process of toxicant service may cause the termites to abandon the concentrator. If this occurs, an unacceptable lapse will occur in the toxicant feeding process. Therefore, the concentrator/feeder apparatus should be designed so that disturbances of the feeder, which are required to remove and replace it as the toxicant material is depleted by the termites, will not negatively affect termite activity in the concentrator.

The job of the termite concentrator is essentially to aggregate as many termites as practical in the immediate vicinity of the toxicant feeder. By way of analogy, an ideal concentrator will be viewed by the termites as a large and inexhaustible "cake", and the toxicant feeder as a somewhat smaller quantity of "frosting". Initially both cake and frosting are supplied, but owing to its scarcity and its greater attraction, the frosting is rapidly depleted. Cake without frosting is still pretty tasty, and end of the frosting is not a deterrent: the party will continue as before. Later, when the frosting is replenished, the guests will eagerly consume it to depletion, whereupon they will again return to the cake, patiently awaiting the arrival of a new supply of frosting.

In this manner, such a concentrator/feeder combination will insure that as many members of the termite colony as possible are exposed to the toxicant provided by the feeder. The concentrator must, therefore, be large enough to continue aggregating termites in high densities as long as necessary for a sufficient quantity of toxicant to be supplied in an incremental fashion, and this means that the termite concentrator must be separate from, but intimately associated with, the toxicant server.

Attracting termites quickly to a food source, and causing them to tenaciously feed upon that food source for a reasonable time period, requires at least three features. These involve a food source (1) that is palatable, (2) of sufficient mass, and (3) with sufficient protected surface area.

Palatability of various termite food sources has been investigated by a number of researchers. Essentially, a food source tends to be palatable to termites if it contains a large cellulose fraction and little or no lignin, and is comparatively easy for the termite to masticate and digest. A large number of food source candidates have been shown to pass this test. It should be noted also that the food source in the concentrator component does not need to be entirely non-toxic. Studies have shown, for example, that food sources impregnated with 0.5% disodium octaborate tetrahydrate, a known inorganic termite toxicant, are still considered acceptably palatable by foraging termites. Likewise, certain insect growth regulators such as methoprene, hydroprene, and fenoxycarb, may not affect the palatability of a food source, even when added to the food source in sufficient quantities to produce desirable toxicant effects in the termites feeding on them. These and similar materials may, by themselves, prove satisfactory as termite colony suppressors. They may also have a very beneficial synergistic effect when used in combination with other toxicants supplied in the toxicant feeder.

Sufficient mass is a more complicated question. Unless the termite colony feels confident that the food source will not be depleted soon, its members will not invest the requisite feeding traffic to that food source needed to the aggregate large numbers of their population at that feeding site. Thus, small food masses are to be avoided. The actual size needed is a matter of conjecture.

Entomologists have used a variety of strategies to arrive at tentative estimates of colony population ranges for several of the most common subterranean termite species. Similarly, laboratory experiments have produced tentative data on the feeding rates, in milligrams of food consumed per day, of termite workers associated with various termite species. Using this information, it is possible to estimate the minimum quantity of food mass, in grams, needed to aggregate large numbers of the most common termite species for a specified period of time.

Colony excavation studies in Mississippi produced population estimates for six *Reticulitermes flavipes* colonies ranging from 53,000 to 363,000. Mark-release-recapture techniques have suggested much larger numbers, but the accuracy of this method has been questioned. There exists, however, a broad consensus among researchers that colonies of Reticulitermes and Coptotermes may exceed a million termites.

Based on these considerations, it is prudent to assume that a given termite colony of unknown size will fall within the range from 500,000 to 2,000,000 individuals. Furthermore, because Reticulitermes species generally produce smaller colonies than the termite species *Coptotermes formosanus*, it may be reasonable to initially treat a Reticulitermnes species of unknown size as though it contained 500,000 termites or less. Similarly, a *Coptotermes formosanus* colony of unknown size might reasonably be treated, at first, as though it contained 2,000,000 termites or less. These initial presumptions should be revised later as the actual voracity of the termite colony becomes more evident.

Food consumption rates, based on laboratory experiments, have produced figures from as low as 0.008 mg/termite/day to as high as 0.196 mg/termite/day. However, only one other study showed such a high consumption, and the bulk of the other studies suggest an upper limit near 0.14 mg/termite/day, regardless of the species involved. It may be reasonable, therefore, to estimate the feeding rate of a subterranean termite colony to be on the order of 0.14 mg/termite/day. This figure may then be combined with the previous colony population estimate to estimate the food mass needed to aggregate the colony in the concentrator for a minimum period of time.

Using these figures, a Reticulitermes spp. colony of unknown size but presumed to number about 500,000, whose colony members consume a food source at the rate of 0.14 mg/termite/day, would have an estimated food requirement of 70 g/day, 2,100 g/month, or 12,600 g over a six month period. Likewise, a *Coptotermes formosanus* colony of unknown size but presumed to number about 2,000,000 would have an estimated food requirement of 280 g/day, or 8,400 g/month, or 50,400 g over a six month period.

Before the above figures can be applied to the design of an efficient termite bait server, the need for sufficient protected surface area must also be considered. Sufficient protected surface area means providing the termites with a ready-made dining room, complete with secure passageways (galleries) and an excellent terrorist alarm system. Subterranean termites have an instinctive need for a protected foraging area, and if that protection is not provided for them, they will not actively consume a food source until they have constructed suitable protective works. This may add a significant and unacceptable time increment to the treatment equation.

How large a dining room is needed depends strictly on how many guests are desired to be served at a time. Obviously, the more surface area that is provided by the food source, the greater the potential for a gargantuan feast. Likewise, the smaller the surface area the smaller the party.

Many approaches have been used to aggregate termites in the field preparatory to removing them to a laboratory environment. Over time it was discovered that certain approaches tended to aggregate larger numbers than others. Toilet paper rolls encased in steel drums, for example, work extremely well because they provide a low density cellulose material that permits termites to effortlessly create protected galleries within them. Even more effective, however, are rolled strips of single-faced corrugated cardboard, because these provide ready-made protected surface areas and, therefore, the termites may begin feeding in them at once.

Single-faced corrugated cardboard is produced by a number of paper companies (e.g., General Paper Company, Baton Rouge, La.) for the packing industry. This product consists of two sheets of kraft paper, one serving as a backing, the other as a corrugated extension that is glued to the backing along the longitudinal line of contact with each corrugation. The corrugations produce a fluted surface and, when the cardboard is rolled along the axis of the corrugations, each flute creates two longitudinal passageways, open at the ends and closed on all other sides. Furthermore, the longitudinal passageways have been shown to provide a positive thigmotatic response in the termites that enter into then, because termites, like cockroaches, prefer to be touched on all sides of an enclosure.

Two flute sizes, designated in the art as A and B, are generally supplied by the paper manufacturers, but the A-sized flute (the smaller of the two) is preferred by termites because its dimensions tend to generate the most positive thigmotactic response in termite foragers. The extended length of the corrugated A-flute surface is approximately 1.3 times the length of the backing it is attached to. Thus, a strip of this material has a combined surface area of 4.6 times its planar area.

La Fage et al. found that up to 33,000 termites of the species Reticulitermes virginicus could be aggregated in a single roll of this material. The dimensions of the roll described in the study suggests that individual termites of this species require about 0.5 cm² of surface area. Similarly, the same study showed that *Coptotermes formosanus* workers required more space, most likely because they tend to be larger physically. From the data in this study relating to the collection of termites at 16 different traps, it could be inferred that *C. formosanus* requires 3.6 times as much space (1.9 cm²) as *R. virginicus*. *R. flavipes* workers, being intermediate in size between *R. virginicus* and *C. formosanus*, would thus require a foraging space somewhere between 0.5 and 1.9 cm². For the purposes of this model the space required for *R. flavipes* is assumed to be 1.0 cm².

The mass of a given termite food source and the protected surface area it provides can be varied with respect to one another to insure that a certain number of termite foragers may be fed with the specific food source over a certain period of time. For example, a food mass of 50 grams, with a protected surface area of 200 cm² would, over its lifetime, have a total feeding capacity of 357,143 termite days. However, its surface area limits it to a maximum of 400 termites of the species *R. virginicus*, 200 termites of the species *R. flavipes*, or 105 termites of the species *C. formosanus* at a time.

Although many studies have been done on various aspects of termite foraging and feeding, few address the details of the daily routine of individual termites. For example, no papers have been found that describe the amount of time termites spend at a food source, either feeding or loitering, during a 24-hour period. Similarly, little is known about how many different food sources are visited each day by individual termites. Several researchers have shown that termites tend to visit all of the food sources in their foraging area on a regular basis, yet these studies are unclear about the amount of food that is consumed at each one. Answering these questions will make it possible to prepare a more realistic model of termite behavior, and studies are underway to arrive at such answers. In the meantime, educated assumptions must be advanced in order to take a first stab at calculating the mass and protected surface area that should be provided in a termite concentrator/feeder in order to concentrate a desired percentage of the termite colony for a desired period of time.

Assuming first that each termite spends only an hour at a time at a food source (one feeding event), and feeds at the same food source a total of four feeding events every 24 hour period, it would be possible for a total of 6 different termites to share the same surface area in a given food source every day. Using this assumption, a food source with a mass of 50 grams and a protected surface area of 200 cm², which is typical of existing termite detector/servers, could accommodate 2,400 different *R. virginicus* workers, 1,200 different *R. flavipes* workers, or 630 different *C. formosanus* workers a day. Such a food mass, while relatively small, would not be depleted by its *R. virginicus* diners for almost five months, or by an *R. flavipes* colony for almost 10 months. A *C. formosanus* colony would not deplete such a food source for almost 19 months.

These numbers are not, by themselves, of much practical importance. However, when the size of the termite colony involved is taken into consideration, their importance becomes immediately apparent. 2,400 *R. virginicus* termites represent less than 0.6%, while 1,500 *R. flavipes* termites represent less than 0.3% of the members of a colony of 500,000 members. To serve 10–20% of the *R. virginicus* colony of 500,000 workers, the food source would have to accommodate 17 to 33 times as many *R. virginicus* workers per day. Similarly, for 10–20% of the *R. flavipes* colony of 500,000 workers to be served each day, the food source would have to serve 33 to 67 times as many of its workers per day.

Note, too, that 630 *C. formosanus* termites represent only 0.03% of the members of a colony of 2,000,000. To serve 10 to 20% of the colony, the food source would have to accommodate from 300–600 times as many termites.

There are two trivial ways to feed additional termite workers at a given location: (1) increase the number of separate food sources, or (2) increase the mass and surface area of the current food source. However, increasing the number of separate food sources only works if the termites can be induced to feed upon them, and smaller food sources have been found to be less attractive to termites. According to a number of studies, the size of the food source directly influences the amount of feeding by individual termites. Specifically, the amount of food consumed per termite per day increases as the total mass (or, possibly, the total protected surface area) increases. This suggests it would be more effective to focus on increasing the mass and surface area of individual food sources rather than on increasing the number of food sources deployed.

Existing detector/servers generally provide palatable food sources, but provide relatively low food mass and surface area with a given detector/server. A review of these devices shows that individual units contain from 10 to 70 grams of food mass, and have surface areas of 84–248 cm². Only two of these provide protected surface areas, and both of these have the lowest surface areas of the group.

Most of these devices do not provide for separating the functions of concentrating termites and feeding them toxicants. With one exception, the discovery of active termites requires that the detector, which is also functioning as a primitive concentrator, be removed and discarded. A toxicant-containing cartridge is then installed in its place. In the exceptional case, where the detector (also functioning as a concentrator) is retained, the surface area of the detector's food mass is entirely unprotected, and only 60% of this surface area is visible to the inspector.

The instant invention provides a concentrator that is separate from, but intimately connected with, a toxicant feeder. The dimensions of the termite concentrator vary over a wide range, to allow for the relatively long-term concentration of a large fraction of a termite colony population at a time. The selection of a particular concentrator for a particular termite infestation is made based on the size of the termite workers in the colony, the estimated population of the termite colony, and the percentage of the termite colony that is desired to be concentrated during a given 24 hour period.

The dimensions of the toxicant feeder provided with the instant invention are generally more restricted than those of the concentrator it is associated with, because toxicant feeders are replaced in the concentrator as they are used up. However, there is no practical restriction on their size, and they could range from less than 100 grams to several kilograms in mass. At least two different classes of toxicant feeders have been deployed in field testing of the instant invention. The larger of these was intended to be used with infestations involving the subterranean termite species *Coptotermes formosanus*, and with any other subterranean termite species when the colony population appears to exceed 1,000,000 members. The smaller toxicant feeder was used with all other subterranean termite infestations.

The development of a simple and efficient termite detector, suitable for high density deployment in areas subject to subterranean termite infestation, led to experimentation with termite concentrators. Several important features of the detector, namely its simplicity and limited mass, militated against its effectiveness as a termite concentrator.

The scientific literature describes a number of devices that have been used by researchers in the past to collect large numbers of termite specimens. These have included the use of pointed wooden survey stakes, single-faced corrugated cardboard rolls encased in plastic pipe sections, wood sandwiches encased is bucket traps, and large steel drums filled with toilet paper rolls. For example, U.S. Pat. No. 5,676,960 describes a termite collection device using a roll of single-faced corrugated cardboard rolled around a block of wood and placed in a length of plastic pipe. This design is similar to the termite collectors used by that inventor and a colleague in collection studies performed in Toronto, Canada.

Based on the reported success of this termite collection method, experiments were conducted to determine if the same or a similar method might have application alongside the detectors of the instant invention. Plastic pipe with an inside diameter of 10 cm was cut into 15 cm lengths, and plastic end caps were fitted to each end to produce a fully enclosed cavity. A series of 3 mm diameter holes were drilled into the sides of the plastic pipe to permit termites to enter and exit the cavity at will, and a roll of single-faced corrugated cardboard was inserted into the enclosed cavity of the pipe.

A number of prototype termite concentrators of this design were then installed in the soil next to signaling termite detectors, where it was known that subterranean termites were actively foraging. As expected, the termites entered these prototype concentrators, generally within days or weeks, and began feeding on the food material therein.

It was noticed early on that the dorsal surface of each roll of corrugated cardboard would show signs of termite activity as soon as the termites entered specific portions of the food mass. However, it was not always possible to discern the extent of the termite activity within the food mass. With the dorsal cap in place, the signs of termite infestation in the food mass, which was observable only on removing the cap, consisted of a collection of soil detritus and termite excreta that formed a generally disorganized scale covering the dorsal surface of the food material. The disorganized nature of the scale caused it to overflow the areas of active infestation into areas not yet infested with termites.

Fortuitously, several of the dorsal caps were accidentally removed from the experimental concentrators between inspection visits. The gardeners at one site habitually raked the areas around the structures at that site, and in the process unknowingly removed several of the dorsal caps. With the dorsal cap removed, the visual features of the infested food mass were significantly different than before. The subterranean termites methodically sealed the dorsal aperture of each flute in the single-faced corrugated cardboard as they included the flute in their feeding zone. This seal was crisp and organized, with little or no overflow into the surrounding portions of food material. Consequently, it was possible to inspect such a food mass and quickly determine the extent of termite activity within it. Furthermore, as in the case of the detector, the sealing of the dorsal surface of the food mass was obvious from a distance, so that an inspector could accurately determine the extent of termite activity within the concentrator from a standing position near the concentrator.

Subsequently, the caps were removed from several other concentrator prototypes, to determine if this would have any negative impact on termite activity within them. No negative effects were noted, despite the fact that the open concentrators were exposed to heavy rains during the experiment.

It was also noted early on that, with large and vigorous termite infestations, the prototype concentrators of this design would be depleted of food material relatively quickly. The ratio of surface area to food mass in this prototype concentrator was very high. In many cases, when a concentrator was inspected one month following its installation, it had already been fully depleted of food material. Using figures taken from research tracts dealing with feeding rates of various species of subterranean termites, it was calculated that a tenacious termite colony of one of several Reticulitermes species would be able to consume all of the food material in a 100 gram food mass within the span of 14 to 26 days. When the food material was depleted, the termites abandoned the concentrator. A number of researchers have actually noted that abandonment of a food source usually occurred before it was fully depleted, and a food source that was only partially depleted would typically experience a noticeable decline in termite activity.

To counteract this problem, experiments were conducted with different food mass combinations. Among the successful combinations tested was the addition of partition board strips rolled with the single-faced corrugated cardboard strip of the original prototype. Partition board is composed of kraft paper formulated without any dimensional stabilizers, such as clay, added to it. It was found, for example, that by adding seven strips of 0.5 mm thick partition board to the single-faced corrugated cardboard, the weight of the food mass in the concentrator could be quadrupled. Simultaneously, the surface area immediately available for feeding was significantly reduced.

The modified concentrators, having the same dimensions as the original prototypes, but with the partition board added, were then tested in the field. All were found to concentrate large numbers of termites (Reticulitermes spp.) for as long as six months or more without being depleted, even when attacked by large, vigorous Reticulitermes colonies. The single-faced corrugated cardboard that was rolled into the food mass provided a relatively large surface area, so that relatively large numbers of termites could begin feeding at once. The signal array in the dorsal surfaces of the modified concentrators, while not as extensive as in the original, continued to provide a satisfactory indication of the extent of subterranean termite activity within the food mass.

Because the partition board was thicker, and hence more rigid, than the kraft paper components of the single-faced corrugated cardboard, it was more difficult to roll the partition board tightly into the center of the food mass. For the sake of convenience, therefore, the central portion of the food mass roll, approximately 3 cm in diameter, was constructed wholly of single-faced corrugated cardboard. Not surprisingly, this portion was often consumed more rapidly than the remainder of the food mass, eventually leaving a 3 cm diameter void in the center of the food mass roll that begged to be replenished. This suggested that it might be advantageous to place a removable feeder in the center of the concentrator food mass. Such a feeder would, for example, provide a means whereby a quantity of termite specimens might be withdrawn for laboratory analysis without disturbing the termites in the remainder of the food mass. Another use for such a feeder would be the measured introduction of toxicants into the termite colony whose members were aggregating and feeding within the concentrator proper.

Experiments were conducted using various diameters of plastic water pipe, all with satisfactory results. However, the thickness of the pipe walls unnecessarily displaced a considerable amount of food mass. A thin-walled plastic sleeve used to encase fluorescent light tubes was then tested. This latter material displaces a minimal amount of food mass, and is relatively inexpensive. All subsequent experiments were conducted using this plastic sleeve to encase the central feeder food mass.

By constructing termite concentrators with removable central feeders, it became possible to sample the termite population feeding in the concentrator without disturbing that termite population. Another use postulated for the central feeder was to introduce a marker, such as a dye known to visually stain the termite's fatty tissue. If a number of concentrator/feeders were installed at a site, and one of these was fitted with a central feeder containing such a marker, the other concentrators could be sampled periodically to determine if marked termites were found within them. If so, it could be reasonably concluded that the same termite colony was feeding in all of the concentrators containing marked termites. If not, more than one termite colony might be involved, and an effective treatment regimen would necessarily require the introduction of toxicants into both termite colonies.

A third use postulated for the central feeder was to make it a vehicle through which toxicants, including various growth regulators, etc., could be introduced to the termites feeding in the concentrator. In order to function in this role, it would have to be demonstrated that replacement feeders are quickly accepted by the termites in the concentrator, so that feeding in the feeder would resume immediately when it was replenished. If so that this method would conceivably result in the managed introduction of a continuous flow of toxicant into the termite colony for as long as needed to suppress that colony's population.

It was already known, based on experimentation with concentrator/feeder combinations, that immediate acceptance of a replacement feeder did not always occur. Sometimes, in fact, the replacement feeder would be ignored by the termites for several weeks. This temporary rejection of the replacement feeder may have been due to a number of possible causes, including, for example, the sealing of the passageways from the concentrator to the central feeder when the latter had been depleted. Replacement of the central feeder would not result in acceptance of the feeder until such seals were removed so that the termites once again had access to its food mass. Obviously, the more activity in the immediate vicinity of the central feeder, the sooner such seals would be reopened. However, the location of the feeder in the center of the food mass may reduce termite activity at the termite feeder, since it was observed that, left to themselves, the termites tended to consume the concentrator food mass from the outside inward.

In earlier experiments it was found that the simple addition of a disk of single-faced corrugated cardboard at the ventral base of the concentrator food mass would result in a more uniform distribution of termite activity within the food mass. That this effect was due to the disk was graphically illustrated by the fact that the signal ports in the dorsal surface of the food mass would become sealed along parallel striations consistent with the layout of the corrugations in the disk. This suggested that it would be possible to direct the termites feeding in the concentrator in such a manner that all of those termites would have to pass in close proximity to the central feeder on their way to and from the concentrator food mass. It was postulated that, if this was done, acceptance of a replacement central feeder food mass would be more rapid than before.

In order to direct all the termites past the central feeder, it was also necessary to prevent them from gaining access to the concentrator food mass via its outer surface. It was clear from earlier field experiments that the termites quickly took advantage of such shortcuts. To prevent this, a thin plastic sheet was inserted into the concentrator food mass under the outer strip of single-faced corrugated cardboard. The termites would be able to feed upon this outer strip, but would not be able to proceed into the remainder of the concentrator's food mass because the plastic strip effectively presented a perimeter barrier to them. A narrow strip of double-faced corrugated plastic was used to complete the barrier.

Experiments with termites in the field and in the laboratory have shown that, when given a choice, termite foragers will attack a food source from the bottom up rather than from the top down. For this reason, it is not generally necessary to seal the surfaces of the food source to keep the termites from using that route of access. The ventral surface of the food source, however, must be sealed. At the same time, two considerations must govern the way this is done: (1) it is preferred that the foraging termites have a continuous surface of food material to explore as they pass over the seals, so the seals should be covered with food material, and (2) the ventral surface of the food mass must remain accessible to the termites, though via a port of entry that requires them to travel to the center of the ventral surface of the concentrator.

One way to attend to the second of these considerations is to place a durable disk of termite resistant material beneath the concentrator food mass. The disk's outer edge can be beveled upward toward the center of the disk, so that the bevel elevates the open dorsal plane of the disk above a closed ventral plane that forms the base of the disk. An aperture, placed at the center of the disk, provides the sole access to the food mass of the concentrator, if the concentrator food mass is pressed down at its outer edges onto the beveled edge of the disk.

Attending to the first consideration, i.e., providing a continuous surface of food material, may be accomplished by placing a disk of double-faced corrugated cardboard beneath the durable disk described above, and placing an aperture in its center that is of lesser diameter than that of the durable disk. When the central feeder is inserted into the concentrator, its ventral surface will contact the dorsal surface of the double-faced corrugated cardboard disk at its central aperture, so that the central feeder rests on the latter disk. If slots are cut in the center of this disk, radiating outward from the center to and beyond the aperture of the durable disk, the termites will have a choice of food materials, i.e., that of the central feeder, or that of the concentrator. This presupposes, of course, that the diameter of the aperture in the durable disk is larger than the outside diameter of the casing enclosing the central feeder, and that the difference between these two diameters is sufficient to allow comfortable passage for the termites.

As the food material in the double-faced corrugated cardboard disk becomes wet, its shape will be subject to deformation if stressed. Removal and reinsertion of the central feeder would supply such stress if nothing is done to prevent it, and this will cause the passageways from the double-faced corrugated cardboard into the central feeder to be obliterated. One solution to this problem is to place a second disk of durable material underneath the double-faced corrugated cardboard disk, and place short, thin slats of durable material at the center and outer edges of this disk to support both the central feeder and the concentrator itself Slots cut in the double-faced corrugated cardboard would allow the slats to project through this food material and make contact with the upper durable disk and the central feeder.

Likewise, the food mass of the concentrator will, as it becomes wet, tend to collapse downward onto the lower surface of the upper durable disk. This will interfere with termite travel within this area To prevent this, thin slats of durable material may be installed within the dorsal cavity of this disk, radiating outward from the center aperture of the disk. These slats will provide dimensional support for the concentrator food mass and prevent it from collapsing downward. If the proximal extremities of these slats are extended inward towards the center of the concentrator so that they contact the outer casing of the central feeder when it is installed, they will also beneficially limit the freedom of movement of the central feeder, and insure that the passageways from the double-faced corrugated cardboard disk into the concentrator ventral cavity are kept open. By beveling these proximal extremities, a smooth reception of the central feeder will be assured.

The structure described above, which is otherwise referred to as a concentrator/feeder combination with a termite director assembly, was tested in the field with excellent results.

As experience with the use of the central feeder increased, concerns surfaced concerning its suitability as a toxicant delivery device. Principally, these concerns dealt with questions about tamper resistance. In its original configuration, the central feeder allowed for easy removal of its food mass so that active termites within it could be collected. This ease of removal militated against the use of that configuration for toxicant delivery purposes, since it is important that human contact with the toxicant be restricted as much as possible.

One way to make the central feeder tamper resistant, so that it could be used as a toxicant delivery device, is to install caps at the dorsal and ventral extremities of the feeder. Such caps would have to allow the unrestricted passage of termites, but prevent the contents of the central feeder from being easily removed. A cap having these features was fabricated by first cutting a slot in the central feeder assembly at its dorsal and ventral extremities, with the slot parallel to the longitudinal axis of the central feeder, and perpendicular to the dorsal and ventral surfaces. Into this slot was inserted a flexible length of durable material whose lateral extremities extended beyond both sides of the central feeder casing. These extremities were then wound around the outer circumference of the central feeder casing. These ends may be permanently affixed to the central feeder outer casing using, for example, a heat weld. Other designs providing tamper resistance have also been evaluated for use with the instant invention, including, for example. Adding an additional slat perpendicular to the first, inserted into a slot cut perpendicular to the first, and integrated into the cap assembly in the same manner as described for the single slat assembly. Both of these designs were tested in the field and found to be satisfactory.

The need for the food material in the central feeder to have direct contact with the food material in the concentrator requires that the former extend to and possibly slightly beyond the ventral aperture of the central feeder casing and cap, suggesting that this food material should not contain toxicants. To allow this, and still permit the central feeder to serve as a toxicant delivery device, several means were devised to provide a cryptic toxicant material interior to the feeder that would not extend to its outer extremities. For example, the toxicant was applied directly to the food material of the central feeder in such a way that it impregnated the central portion of the food material but not its outer edges. This approach works well with toxicants that are applied in a slurry or gel, and that do not creep far beyond the area of application.

Many toxicants, however, are most easily applied to the food material as solutes dissolved in a volatile liquid, so that the food material may be dipped in the solution and, when the volatile carrier has evaporated, the toxicant remains behind. In such cases, the toxicant-containing food material may simply supplement the central feeder's non-toxic food material, such that the dimensions of the supplementary food material, being the lesser of the two, prevent the latter from extending to the outer extremities of the central feeder. Both of the above approaches to providing a cryptic toxicant within the central feeder were tested in the field with satisfactory results.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. It is therefore intended that the appended claims encompass any such modifications or embodiments.

I claim:

1. A detector, comprising;

a body member having an upper body opening and a cavity extending therefrom the body member being comprised of a bait material attractive to wood destroying insects, a mesh disposed across said cavity, and further comprising a reflective material disposed within said vertically extending cavity being visually ascertainable through said upper body opening.

2. The detector as specified in claim 1 wherein said mesh is disposed across said upper body opening.

3. The detector as specified in claim 1 wherein said body member further comprises at least one lateral ingress/egress port in communication with said upper body opening.

4. The detector as specified in claim 3 wherein said body member comprises a plurality of lateral ingress/egress ports each in communication with said upper body opening.

5. The detector as specified in claim 1 wherein said vertically extending cavity has an upper portion having a first diameter, and a lower portion having a second diameter, said upper portion first diameter being greater than the second diameter of said lower portion.

6. The detector as specified in claim 5 wherein said reflective material is disposed upon a transition portion defined between said cavity upper portion and said cavity lower portion.

7. The detector as specified in claim 6 wherein said reflective material comprises a reflective disk having an opening extending therethrough, said opening of said disk having a diameter comensurate with the diameter of the lower portion of the vertically extending cavity.

8. The detector as specified in claim 1 wherein said body member is impregnated with a chemical absorbable by a termite and detectable in fecal material of a termite when consumed thereby.

9. A method of detecting the presence of subterranean termites using a detector having a body member having an upper opening and comprised of a bait material attractive to the wood destroying insects, the body member having a passageway extending therethrough from said upper body opening, and a mesh disposed across said passageway comprising the steps of:

disposing the body member into soil; and detecting any obstruction of the mesh by the subterranean termites to a ascertain the presence of the termites.

10. The method as specified in claim 9 wherein said detector further comprises a reflective material disposed in the passageway, further comprising the step of:

shining a light into the vertically extending passageway through the upper body opening; and ascertaining any reflection of the light from the reflective material.

11. The method as specified in claim 9 wherein said body member is impregnated with a substance, further comprising the step of:

detecting the presence of said substance in fecal material of termites forming a portion of said obstruction.

12. A detector, comprising;

a body member having an upper body opening and a cavity extending therefrom, the body member being comprised of a bait material attractive to wood destroying insects, and a mesh disposed across said cavity, wherein said body member further comprises at least one lateral ingress/egress port in communication with said upper body opening.

13. A detector, comprising;

a body member having an upper body opening and a cavity extending therefrom, the body member being comprised of a bait material attractive to wood destroying insects, and a mesh disposed across said cavity, wherein said body member is impregnated with a chemical absorbable by a termite and detectable in fecal material of a termite when consumed thereby.

* * * * *